US008983654B2

(12) United States Patent
Sugimoto

(10) Patent No.: US 8,983,654 B2
(45) Date of Patent: Mar. 17, 2015

(54) MEDICINE PACKING APPARATUS

(75) Inventor: Tomohiro Sugimoto, Toyonaka (JP)

(73) Assignee: Yuyama Mfg. Co., Ltd., Toyonaka-Shi (JP)

( * ) Notice: Subject to any disclaimer, the term of this patent is extended or adjusted under 35 U.S.C. 154(b) by 247 days.

(21) Appl. No.: 13/500,900

(22) PCT Filed: Nov. 1, 2010

(86) PCT No.: PCT/JP2010/069397
§ 371 (c)(1),
(2), (4) Date: Apr. 6, 2012

(87) PCT Pub. No.: WO2011/052766
PCT Pub. Date: May 5, 2011

(65) Prior Publication Data

US 2012/0239188 A1 Sep. 20, 2012

(30) Foreign Application Priority Data

Nov. 2, 2009 (JP) ................................. 2009-252466

(51) Int. Cl.
*G06F 17/00* (2006.01)
*B65B 61/02* (2006.01)
*G07F 17/00* (2006.01)
(Continued)

(52) U.S. Cl.
CPC .......... *B65B 61/025* (2013.01); *G07F 17/0092* (2013.01); *B65B 5/103* (2013.01); *B65B 9/067* (2013.01); *B65B 61/26* (2013.01)
USPC ............................ 700/240; 700/235; 700/242

(58) Field of Classification Search
CPC .... G07F 17/0092; A61J 7/0084; B65B 5/103; B65D 75/42
USPC ............................ 700/235, 240, 242; 53/411
See application file for complete search history.

(56) References Cited

U.S. PATENT DOCUMENTS 4,972,657 A * 11/1990 McKee ........................... 53/411
5,348,061 A * 9/1994 Riley et al. ........................ 221/9
(Continued)

FOREIGN PATENT DOCUMENTS

EP 1704844 A1 9/2006
JP 2000-185903 A 7/2000
(Continued)

*Primary Examiner* — Timothy Waggoner
(74) *Attorney, Agent, or Firm* — Masuvalley & Partners

(57) ABSTRACT

Systems and methods for delivering and packing medicines are described. The systems and methods allows for understanding relations between the medicines and a production-history information piece even if the medicines are having different production-history information pieces while being of the same type. A medicine dispensing apparatus includes a medicine delivery means, a medicine preparation means, a packing means, and a control means capable of controlling operations from delivery of the medicine to packing of the medicine according to prescription data and further specifying a production-history information piece of the medicine delivered from the medicine delivery means. The medicine dispensing apparatus further includes a printing means for printing the production-history information pieces on a packaging sheet. When the medicine to be packed as one dose includes different production-history information pieces, while being of the same type, the medicines are packed separately into different packs based on their respective production-history information pieces.

29 Claims, 15 Drawing Sheets

(51) Int. Cl.

| | |
|---|---|
| ***B65B 9/067*** | (2012.01) |
| ***B65B 61/26*** | (2006.01) |
| *B65B 5/10* | (2006.01) |

(56) References Cited

U.S. PATENT DOCUMENTS

| | | | | |
|---|---|---|---|---|
| 5,481,855 | A * | 1/1996 | Yuyama | 53/493 |
| 6,370,841 | B1 * | 4/2002 | Chudy et al. | 700/235 |
| 6,722,545 | B2 * | 4/2004 | Yuyama et al. | 225/96.5 |
| 7,549,268 | B2 * | 6/2009 | Kim | 53/411 |
| 7,631,670 | B2 * | 12/2009 | Geltser et al. | 221/2 |
| 7,963,201 | B2 * | 6/2011 | Willoughby et al. | 221/25 |
| 2007/0150092 | A1 | 6/2007 | Ohmura et al. | |

FOREIGN PATENT DOCUMENTS

| | | | |
|---|---|---|---|
| JP | 2001-278231 | A | 10/2001 |
| JP | 2005-192702 | A | 7/2005 |
| JP | 2006-335377 | A | 12/2006 |
| JP | 2007-082622 | A | 4/2007 |
| JP | 2008-62945 | A | 3/2008 |
| JP | 2009-029510 | A | 2/2009 |
| WO | 2005/065627 | A1 | 7/2005 |
| WO | 2009/005044 | A1 | 1/2009 |

* cited by examiner (a)

(b)

MEDICINE PACKING APPARATUS

CROSS-REFERENCE TO RELATED APPLICATIONS

This application is a national phase application under 35 U.S.C. §371 of International Application Serial No. PCT/JP2010/069397 filed on Nov. 1, 2010, and claims the priority under 35 U.S.C. §119 to Japanese Patent Application No. 2009-252466, filed on Nov. 2, 2009. These applications are hereby incorporated by reference.

TECHNICAL FIELD

The present invention relates to a medicine packing apparatus which is capable of delivering and packing medicines according to prescription.

BACKGROUND OF THE INVENTION

Conventionally, there have been provided medicine packing apparatuses as disclosed in Patent Literatures 1 and 2 described below. The medicine packing apparatus disclosed in Patent Literature 1 includes a packing device for packing medicines, and a printer, and is capable of packaging the medicines in dose units in the packing device. In addition, at the time of the packaging, the medicine packing apparatus is capable of printing information pieces such as directions for use including a dose timing, and a patient's name with the printer.

Further, in the medicine packing apparatus disclosed in Patent Literature 2, history information pieces peculiar to medicines, such as use-by dates and lot numbers of the medicines (hereinafter, also referred to as "production-history information pieces") can be printed on a packaging sheet at the time of packing. Thus, when the medicines are packed with this medicine packing apparatus, expired medicines are prevented from being taken, and surveys on histories of the medicines can be easily conducted.

CITATION LIST

Patent Literature

[PTL 1]: JP2000-185903 A
[PTL 2]: JP2008-62945 A

BRIEF SUMMARY OF THE INVENTION

Technical Problem

In the above-mentioned conventional medicine packing apparatuses, medicines corresponding to one dose are determined as one unit according to prescription, and collectively packed in one pack. Thus, for example, when medicine shortage occurs during a packing operation, medicines having different production-history information pieces such as use-by dates and lot numbers may be packed in the same pack in some cases. In the above-mentioned conventional medicine packing apparatuses, the respective use-by dates and lot numbers are printed along with each other on the packaging sheet when the medicines having different production-history information pieces are collectively packed in one pack as described above. However, there is such a problem that correspondences between the packed medicines and the printed production-history information pieces become indistinguishable.

Under the circumstance, the present invention has been made to achieve an object of providing a medicine packing apparatus which is capable of packing medicines so that relations between the medicines and the production-history information pieces can be clearly understood even when the medicines prepared as one dose include the medicines having the different production-history information pieces while being of the same type.

Solution to Problem

In order to solve the above-mentioned problem, the present invention provides a medicine packing apparatus, including: medicine delivery means which is capable of delivering a medicine; medicine preparation means which is capable of receiving the medicine delivered by the medicine delivery means and is capable of delivering the medicine at a predetermined timing; packing means which is capable of packing the medicine delivered from the medicine preparation means with a packaging sheet; control means which is capable of controlling operations from delivery of the medicine to packing of the medicine according to prescription data and is capable of specifying a production-history information piece of the medicine delivered from the medicine delivery means; packaging-sheet feeding means which is capable of feeding the packaging sheet used for the packing of the medicine; and printing means which is capable of printing the production-history information piece on the packaging sheet fed from the packaging-sheet feeding means to the packing means, in which, when the medicine, which is delivered from the medicine delivery means as medicines to be packed as one dose, includes a medicine having a different production-history information piece while being of the same type, the medicines are packed separately into different packs based on the respective production-history information pieces of the medicines.

Further, a medicine packing apparatus according to the present invention includes: medicine delivery means which is capable of delivering a medicine; medicine preparation means which is capable of receiving the medicine delivered by the medicine delivery means and is capable of delivering the medicine at a predetermined timing; packaging-sheet feeding means which is capable of feeding a packaging sheet used for packing of the medicine; packing means which is capable of packing the medicine delivered from the medicine preparation means with the packaging sheet fed from the packaging-sheet feeding means; printing means which is capable of printing a production-history information piece of the medicine delivered from the medicine delivery means on the packaging sheet fed from the packaging-sheet feeding means to the packing means; and control means which is capable of controlling operations from delivery of the medicine to the packing of the medicine according to prescription data, in which the medicine delivery means includes a plurality of medicine feeders each capable of accommodating and delivering the medicine, in which the control means includes a memory portion for storing the production-history information piece of the medicine accommodated in each of the plurality of medicine feeders and is capable of specifying the production-history information piece with reference to the memory portion, and in which the medicine packing apparatus includes the steps of: specifying, among the plurality of medicine feeders, a medicine feeder accommodating a packing-object medicine as a selected feeder, and delivering the packing-object medicine; comparing an actual delivery number of medicines delivered from the selected feeder to a designated delivery number of medicines designated based on the prescription data; judging that medicine shortage occurs in the selected feeder when the actual delivery number is smaller than the designated delivery number; confirming whether or not an alternative feeder accommodating the packing-object medicine exists among the plurality of medicine feeders when it is judged that the medicine shortage occurs in the selected feeder; delivering, from the alternative feeder, a medicine that is short in supply in the operation of the delivery of the medicine from the selected feeder when the alternative feeder exists; and performing separate packing in which medicines to be packed as one dose are packed separately into different packs based on respective production-history information pieces of the medicines to be packed as one dose when it is confirmed that the delivery of the medicine from the selected feeder has been completed.

The above-mentioned medicine packing apparatus according to the present invention includes: medicine delivery means which is capable of delivering a medicine; medicine preparation means which is capable of receiving the medicine delivered by the medicine delivery means and is capable of delivering the medicine at a predetermined timing; packaging-sheet feeding means which is capable of feeding a packaging sheet used for packing of the medicine; packing means which is capable of packing the medicine delivered from the medicine preparation means with the packaging sheet fed from the packaging-sheet feeding means; printing means which is capable of printing a production-history information piece of the medicine delivered from the medicine delivery means on the packaging sheet fed from the packaging-sheet feeding means to the packing means; and control means which is capable of controlling operations from delivery of the medicine to the packing of the medicine according to prescription data, in which the medicine delivery means includes a plurality of medicine feeders each capable of accommodating and delivering the medicine, in which the control means includes a memory portion for storing the production-history information piece of the medicine accommodated in each of the plurality of medicine feeders and is capable of specifying the production-history information piece with reference to the memory portion, in which the memory portion further includes an input device which enables input of the production-history information piece, and in which the medicine packing apparatus includes the steps of: specifying, among the plurality of medicine feeders, a medicine feeder accommodating a packing-object medicine, and delivering the packing-object medicine; comparing an actual delivery number of medicines delivered from the specified medicine feeder to a designated delivery number of medicines designated based on the prescription data; judging that medicine shortage occurs in the specified medicine feeder when the actual delivery number is smaller than the designated delivery number; loading the packing-object medicine into the specified medicine feeder when it is judged that the medicine shortage occurs in the specified medicine feeder, and delivering, from the specified medicine feeder, a medicine that is short in supply at a stage preceding the loading of the packing-object medicine into the specified medicine feeder when a production-history information piece of the packing-object medicine to be loaded is input from the input device to the memory portion; and performing separate packing in which medicines to be packed as one dose are packed separately into different packs based on the production-history information piece of the medicine accommodated in each of the plurality of medicine feeders and the production-history information piece of the loaded packing-object medicine when it is confirmed that the delivery of the medicine that is short in supply has been completed.

In the above-mentioned medicine packing apparatus according to the present invention, the printing means is capable of printing a predetermined information piece including the production-history information piece on the packaging sheet based on print data issued from the control means, and when the separate packing is performed, among the medicines to be packed as one dose, print data of a pre-delivered medicine that has been delivered by the time when the medicine shortage occurs and print data of a post-delivered medicine that has been delivered after the medicine shortage occurs are issued from the control means.

In the medicine packing apparatus according to the present invention, it is desired that the printing means be arranged on an upstream side in a feeding direction of the packaging sheet with respect to the packing means, and at or after a timing when the medicine is delivered from the medicine delivery means, an information piece of the delivered medicine be printed by the printing means.

Further, in the medicine packing apparatus according to the present invention, it is preferred that the printing means be arranged on an upstream side in a flow direction of the packaging sheet fed from the packaging-sheet feeding means with respect to the packing means, that the medicine preparation means include a turnable division formation body, and have an opening through which the medicine is delivered from the medicine preparation means and a hole through which the medicine delivered from the medicine delivery means is charged, that the division formation body include a plurality of divisions in a circumferential direction, each of which is capable of stocking the medicine in a pack unit, that, when the division formation body turns so that each of the plurality of divisions comes to a position corresponding to the hole, the medicine be allowed to be charged into each of the plurality of divisions through the hole, that, when the division formation body turns so that each of the plurality of divisions comes to a position corresponding to the opening, the medicine in each of the plurality of divisions be delivered, and that the hole be provided at a position on an upstream side in a turning direction of the division formation body with respect to the opening.

When the medicine packing apparatus according to the present invention is structured as described above, it is preferred that a length of a path, which the packaging sheet passes, between the printing means and the packing means be set to be n times as large as a length of the packaging sheet required for packaging of the medicines corresponding to one pack, and that the hole be provided at a position on the upstream side by an amount corresponding to n or more divisions in the turning direction of the division formation body with respect to the opening.

In the medicine packing apparatus according to the present invention, it is desired that the production-history information piece include an information piece including at least any one of a production lot number of the medicine, a production date of the medicine, and a use-by date of the medicine.

Advantageous Effects of Invention

In the medicine packing apparatus of the present invention, the control means is capable of specifying the production-history information pieces based on the production histories of the medicines delivered from the medicine delivery means. Thus, when being delivered from the medicine delivery means, the medicines having the different production-history information pieces while being of the same type are packed separately into different packs based on the different production-history information pieces. Further, in the medicine packing apparatus of the present invention, the production-history information pieces of the medicines specified by the control means are printed on the packaging sheets by the printing means. Thus, according to the medicine packing apparatus of the present invention, the medicines can be packed so that the relations between the medicines and the production-history information pieces can be clearly understood.

Further, in the case where the medicine, which is delivered from the medicine delivery means as medicines to be packed as one dose, includes the medicine having the different production-history information piece while being of the same type, those medicines are packed separately into different packs based on the respective production-history information pieces thereof. With this, those medicines having the different production-history information pieces while being of the same type are reliably prevented from being mixed into a single pack. Thus, according to the present invention, it is possible to provide a medicine packing apparatus which enables the correspondences between the medicines and the production-history information pieces to be easily and reliably understood.

According to the medicine packing apparatus of the present invention, the medicine delivery means includes the plurality of medicine feeders each capable of accommodating and delivering the medicine. When the actual delivery number of the medicines delivered from the specified medicine feeder is smaller than the designated delivery number of the medicines designated based on the prescription data, it is judged that the medicine shortage occurs in the specified medicine feeder. As a result, the medicines to be packed as one dose are packed separately into the different packs based on the respective production-history information pieces thereof (separate packing). Thus, according to the medicine packing apparatus of the present invention, even when the shortage occurs in the medicine feeder and the medicines having the different production-history information pieces while being of the same type are delivered as one dose, the medicines having the different production-history information pieces while being of the same type are reliably prevented from being mixed into a single pack. Thus, according to the present invention, it is possible to provide a medicine packing apparatus which enables the correspondences between the medicines and the production-history information pieces to be easily and reliably understood.

Further, according to the medicine packing apparatus of the present invention, when the separate packing is performed, among the medicines to be packed as one dose, the print data of the pre-delivered medicine that has been delivered by the time when the medicine shortage occurs and the print data of the post-delivered medicine that has been delivered after the medicine shortage occurs are issued from the control means. Thus, information pieces including the production-history information pieces are printed on both a bag packing the pre-delivered medicine and a bag packing the post-delivered medicine. As a result, the correspondences between the medicines and the production-history information pieces are clarified.

According to the medicine packing apparatus of the present invention, the printing means is arranged on the upstream side in the feeding direction of the packaging sheet with respect to the packing means, and at or after the timing when the medicine is delivered from the medicine delivery means, the information piece of the delivered medicine is printed by the printing means. Thus, the packaging sheet and the like are prevented from being wasted.

As described above, in the medicine packing apparatus of the present invention, the length of the path, which the packaging sheet passes, between the printing means and the packing means is set to be n times as large as the length of the packaging sheet required for packaging of the medicines corresponding to one pack. Further, the medicine preparation means provided to the medicine packing apparatus of the present invention includes the plurality of divisions so that the medicines charged in the plurality of divisions can be delivered in a predetermined order. Thus, in the medicine packing apparatus of the present invention, the medicines delivered from the above-mentioned division X are packed with the packaging sheet which undergoes printing by the printing means at a timing preceding a timing when the medicines stocked in one division X of the plurality of divisions are delivered by the time period required for delivery of the medicines corresponding to n divisions (n packs) from the medicine preparation means toward the packing means. That is, in the medicine packing apparatus of the present invention, medicines to be packed are charged into the division X at a timing preceding performing printing corresponding to the division X onto the packaging sheet, and a timing when the medicines prepared in the division X are delivered into a packing portion and a timing when a part of the packaging sheet, at which information pieces such as production-history information pieces of the medicines accommodated in the division X, comes to the packing portion correspond to each other. Thus, in the medicine packing apparatus of the present invention, the packaging sheet undergoes printing on a premise that the medicines to be packed have been charged in the division X, and hence whether or not the medicines to be packed have been correctly charged can be easily monitored. Further, in the medicine packing apparatus of the present invention, printing is not performed on the packaging sheet in case of a failure of medicine supply, and hence the packaging sheet and the like are prevented from being wasted by that much. Note that, the structure of the present invention can be suitably employed on a premise that lengths of the packaging bags formed of the packaging sheet are constant, and cannot be employed when the lengths of the packaging bags vary.

When the medicine packing apparatus of the present invention is structured as described above, it is preferred to set the following as a condition for performing printing on the packaging sheet by the printing means: the medicines have been charged into the division X by the timing preceding the timing when the medicines stocked in the one division X of the plurality of divisions in the medicine preparation means are delivered by the time period required for delivery of the medicines corresponding to the n divisions from the medicine preparation means.

In the medicine packing apparatus of the present invention, the medicines are delivered from the medicine delivery means into the division X at the timing preceding the timing when the medicines stocked in the division X in the medicine preparation means are delivered by the time period or more required for delivery of the medicines corresponding to the n divisions from the medicine preparation means. Thus, in the medicine packing apparatus of the present invention, the information pieces corresponding to the division X are printed on the packaging sheet under a state in which the medicines have been reliably charged in the division X. Thus, according to the medicine packing apparatus of the present invention, whether or not the medicines to be packed have been correctly packed can be easily monitored, and even when the failure of medicine supply occurs, waste of the packaging sheet and the like involved therewith can be eliminated.

Further, when the above-mentioned production-history information piece includes the information piece including at least any one of the production lot number of the medicine, the production date of the medicine, and the use-by date of the medicine, production histories of the medicines can be traced, and the use-by dates of the medicines can be easily understood.

BRIEF DESCRIPTION OF DRAWINGS

FIG. 6(*b*) is an explanatory diagram illustrating a stage in which rest sides thereof are sealed.

DETAILED DESCRIPTION OF THE INVENTION

Description of Embodiment

Next, description is made in detail of a medicine packing apparatus 10 according to an embodiment of the present invention with reference to figures. Note that, the present invention is not limited to the embodiment.

Figure 1:
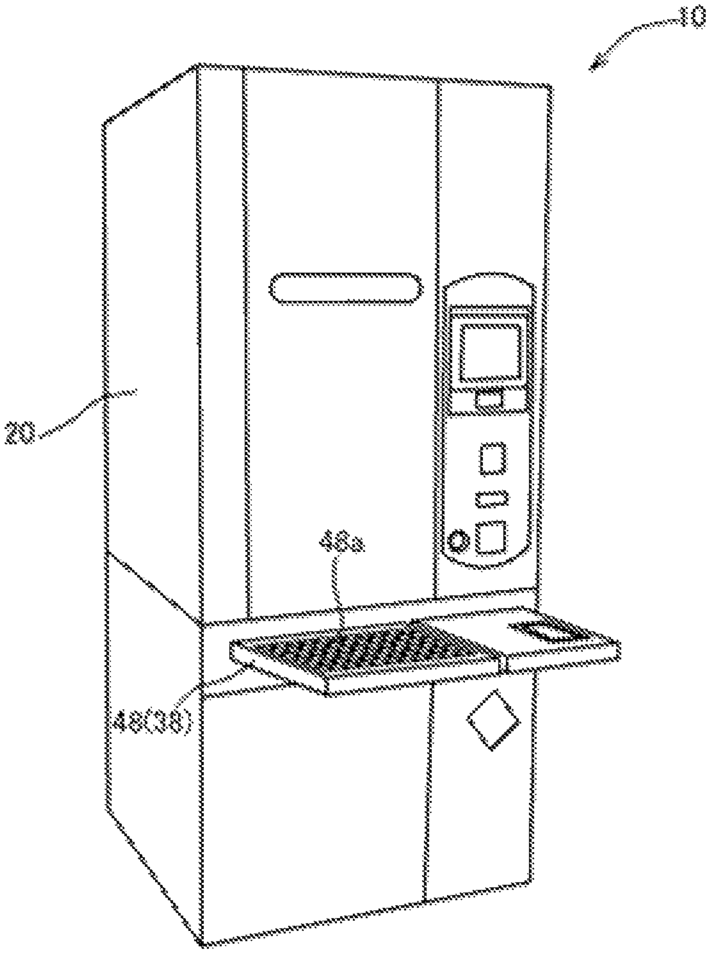
FIG. 1 is a perspective view of a medicine packing apparatus according to an embodiment of the present invention.
Figure 2:
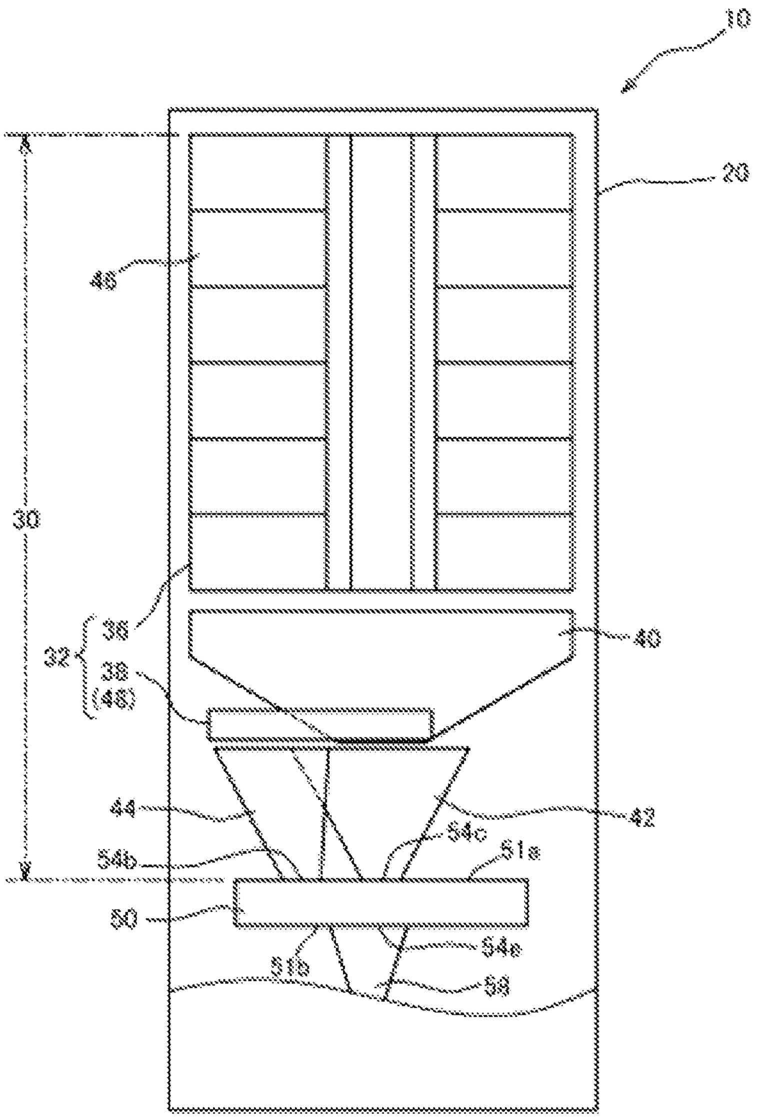
FIG. 2 is a schematic front view of an internal structure of the medicine packing apparatus illustrated in FIG. 1.
Figure 3:
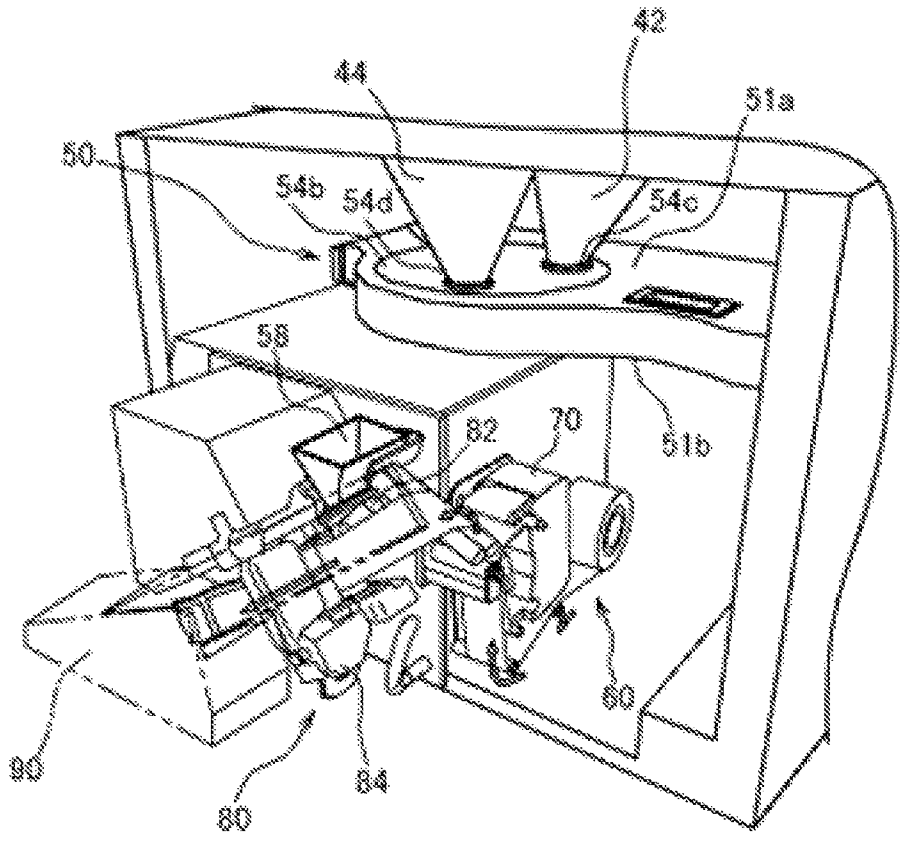
FIG. 3 is a perspective view of an internal structure of a lower portion of the medicine packing apparatus illustrated in FIG. 1.
Figure 7:
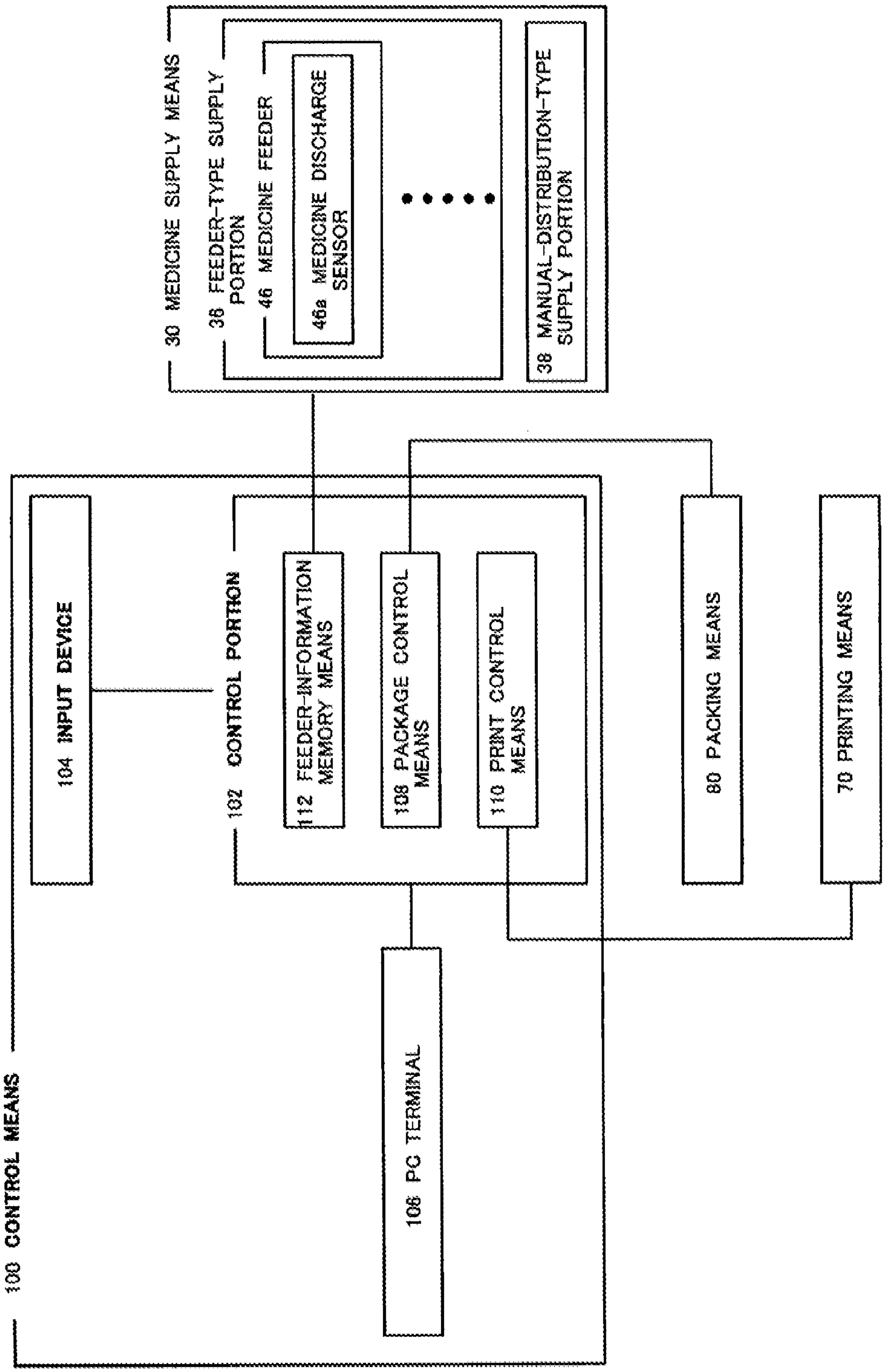
FIG. 7 is a block diagram illustrating a configuration of control means.

The medicine packing apparatus 10 packs medicines with packaging sheets P according to prescription, and delivers the medicines. As illustrated in FIG. 1, the medicine packing apparatus 10 includes a main unit 20 having a rectangular-parallelepiped shape. As illustrated in FIG. 2, the medicine packing apparatus 10 includes medicine delivery means 30 and medicine preparation means 50 which are provided in the main unit 20. Further, as illustrated in FIG. 3, on a lower side of the main unit 20, there are provided packaging-sheet feeding means 60, printing means 70, packing means 80, and a packaging-sheet sending mechanism 90. Further, as illustrated in FIG. 7, the medicine packing apparatus 10 includes control means 100.

The medicine delivery means 30 is provided to store medicines and to appropriately discharge the medicines according to prescription so as to supply the medicines to the packing means 80. The medicine delivery means 30 includes a supply portion 32. The supply portion 32 has such a function as to store the medicines and discharge the medicines according to prescription toward the medicine preparation means 50. Further, the medicine preparation means 50 has such a function as to stock the medicines supplied from the supply portion 32 by an amount to be packed in the same pack, and to successively discharge the medicines by such an amount toward the packing means 80.

Specifically, as illustrated in FIG. 2, the supply portion includes a feeder-type supply portion 36 and a manual-distribution-type supply portion 38 as means for supplying the medicines. In addition, the supply portion 32 includes a standby hopper 40, a collection hopper 42, and a manual-distribution hopper 44. The feeder-type supply portion 36 includes a large number of cassette-type medicine feeders 46, and is capable of discharging, according to prescription, the medicines prepared in the medicine feeders 46 in advance. The standby hopper 40 is arranged below the feeder-type supply portion 36. The standby hopper 40 is openable and closable by movement control from the control means 100, and collects, in a close state, the medicines delivered from the medicine feeders 46 by such an amount as to be packed in the same pack and then is opened through activation of a power source (not shown), thereby being capable of discharging the collected medicines at one time. The medicines discharged from the standby hopper 40 are supplied to the medicine preparation means 50 through intermediation of the collection hopper 42 provided below the standby hopper 40. Further, the feeder-type supply portion 36 is provided with a medicine discharge sensor 46*a* for detecting discharge of the medicines for each of the medicine feeders 46.

Further, the manual-distribution-type supply portion 38 is prepared separately from the feeder-type supply portion 36, and is used for supplying medicines unsuitable to delivery from the feeder-type supply portion 36 and medicines not prepared in the feeder-type supply portion 36 so that those medicines are packed. Similarly to the feeder-type supply portion 36, the manual-distribution-type supply portion 38 is capable of supplying the medicines to a medicine-preparation-means-50 side. The manual-distribution-type supply portion 38 includes a manual-distribution unit 48. Although being normally accommodated in the main unit 20, the manual-distribution unit 48 can be used by being drawn out to a front side of the main unit 20 when necessary as illustrated in FIG. 1. As illustrated in FIG. 1, the manual-distribution unit 48 is provided with a plurality of cells 48*a* which are arranged in a matrix-like manner and capable of collectively accommodating medicines to be packed in a single pack. In the manual-distribution unit 48, the cells 48*a* are opened one by one so that the medicines can be supplied in pack units to the medicine-preparation-means-50 side. When the manual-distribution unit 48 is brought into the drawn-out state as illustrated in FIG. 1, such a state is reached that the medicines can be replenished into the cells 48*a*. Further, when the manual-distribution unit 48 is brought into such a state as to be accommodated in the main unit of the medicine packing apparatus 10, the manual-distribution hopper 44 comes below the manual-distribution unit 48, and then such a state is reached that the medicines prepared in the cells 48*a* can be supplied to the medicine-preparation-means-50 side through intermediation of the manual-distribution hopper 44 provided below the manual-distribution unit 48.

Figure 4:
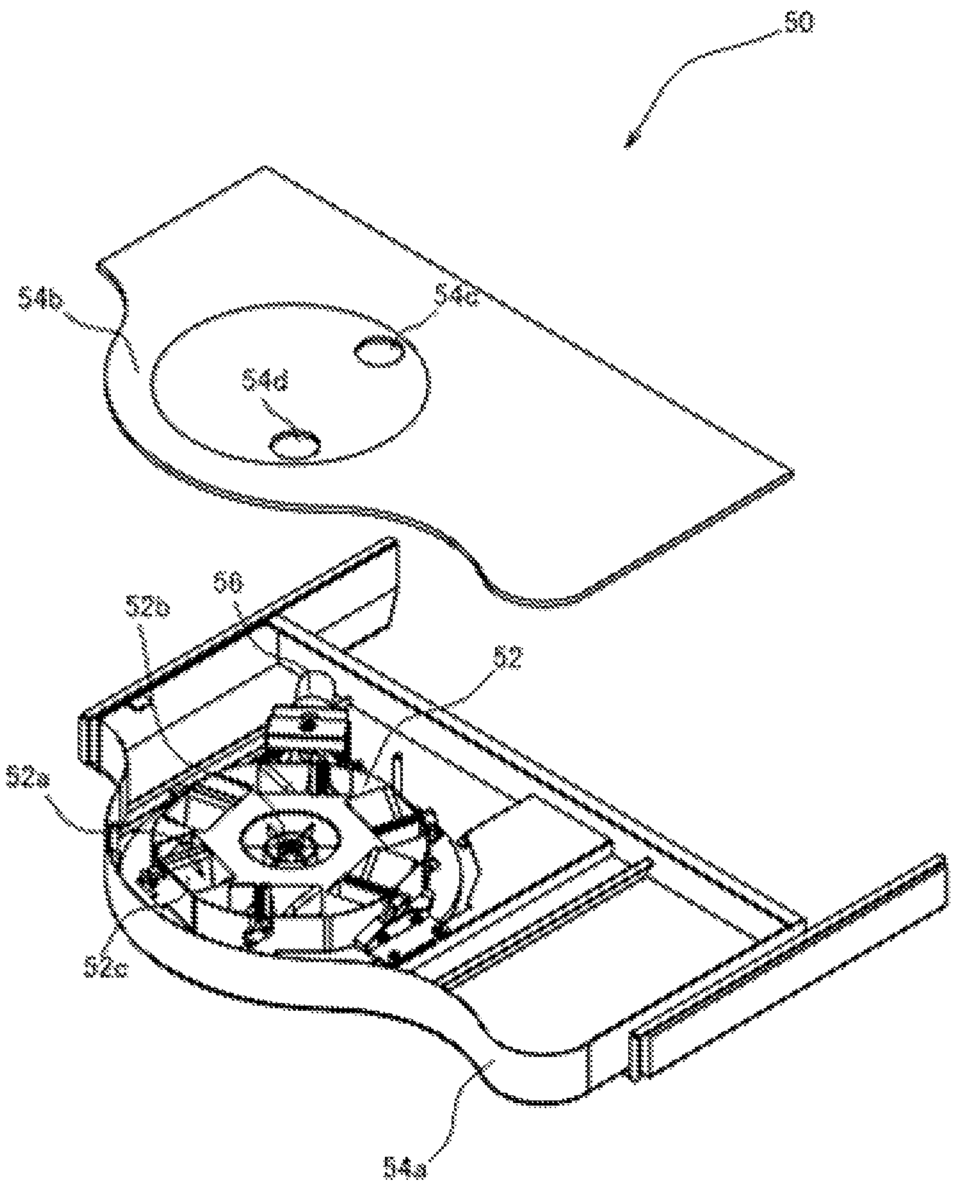
FIG. 4 is an exploded perspective view of medicine preparation means.
Figure 5:
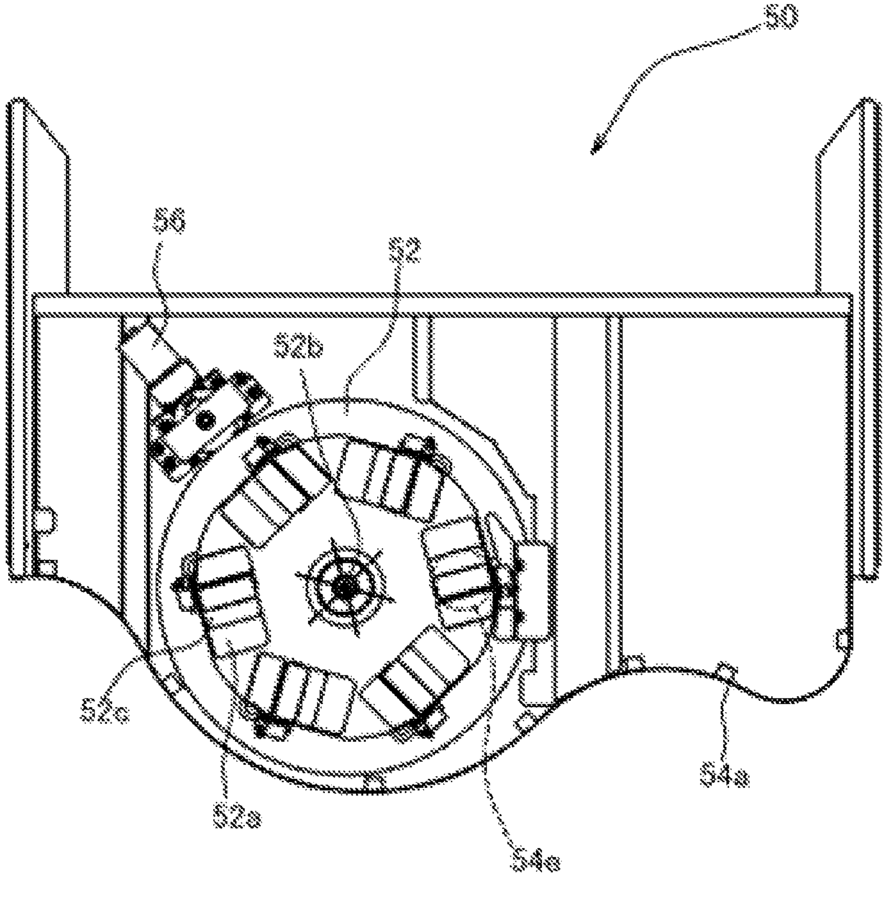
FIG. 5 is a plan view of an internal structure of the medicine preparation means.

As illustrated in FIGS. 4 and 5, in the medicine preparation means 50, a disc-like division formation body 52 is accommodated in a space constituted by a medicine-preparation-portion main unit 54*a* and a lid 54*b*. The division formation body 52 includes a division 52*a* for stocking the medicines. The division formation body 52 is capable of turning about a support shaft 52*b* by receiving power from a power source 56 provided in the medicine-preparation-portion main unit 54*a*. The division 52*a* of the division formation body 52 includes a plurality of divisions 52*a* in a circumferential direction. As described below, in order that the medicines are prepared at a stage preceding, by a time period or more required for packing of the medicines corresponding to n packs (three packs in this embodiment), a timing when the medicines are packed in the packing means 80, the division formation body 52 is required to include at least n or more divisions 52*a*. Therefore, the division formation body 52 is required to include at least three divisions 52*a*. In this embodiment, the division formation body 52 is provided with six divisions 52*a*, and hence the medicines can be prepared at the stage preceding the time period or more required for packing of the medicines corresponding to n packs (three packs in this embodiment).

Each of the divisions 52*a* is open on a top surface side. Further, each of the divisions 52*a* is provided at such a position as to be communicable to charging ports 54*c* and 54*d* provided in the lid 54*b* when the division formation body 52 is turned about the support shaft 52*b*. Still further, as illustrated in FIG. 3, the collection hopper 42 and the manual-distribution hopper 44 are connected respectively to the charging ports 54*c* and 54*d*. Thus, when the division formation body 52 is turned, the medicines supplied from the feeder-type supply portion 36 and the manual-distribution-type supply portion 38 can be supplied into the divisions 52*a* through the charging ports 54*c* and 54*d*.

In the division formation body 52, each of the divisions 52*a* is provided with a shutter 52*c* independently openable and closable. The division formation body 52 is capable of discharging downward the medicines accommodated in each of the divisions 52*a* from a bottom side by opening the shutter 52*c*. Further, each of the divisions 52*a* is provided at such a position as to be capable of passing above an opening 54*e* (refer to FIG. 5) provided in a bottom surface of the medicine-preparation-portion main unit 54*a* when the division formation body 52 is turned about the support shaft 52*b*. Still further, as illustrated in FIGS. 2 and 3, a discharge hopper 58 is provided below the opening 54*e* so that the medicines discharged through the opening 54 can be supplied to a packing-means-80 side. Thus, when turning the division formation body 52 and opening the shutter 52*c* provided to the division 52*a* positioned above the opening 54*e*, the medicines accommodated in the division 52*a* can be supplied to the packing-means-80 side through the opening 54*e*.

Figure 12:
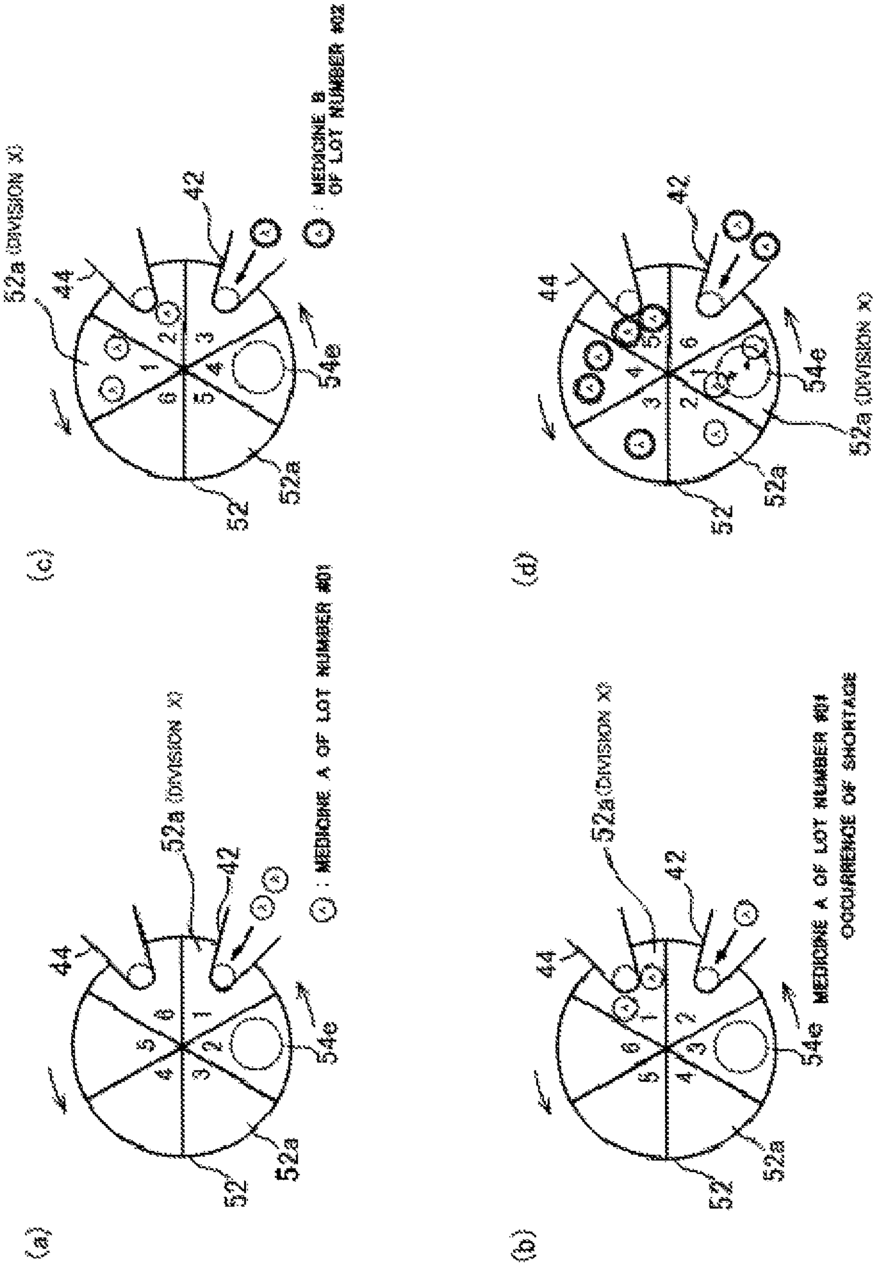
FIGS. 12(*a*) to (*d*) are explanatory diagrams sequentially illustrating an operation of a division formation body.

Here, the above-mentioned medicine preparation means 50 is capable of delivering the medicines in pack units (every division 52*a*) by turning in a fixed direction as indicated by arrows of FIG. 12 so as to successively move the divisions 52*a* to a position corresponding to the medicine-delivery opening 54*e*. That is, the medicines accommodated in each of the divisions 52*a* are delivered at such a timing as to reach the opening 54*e*. Thus, the above-mentioned collection hopper 42 and manual-distribution hopper 44 are capable of charging medicines into the division 52*a* at a timing preceding, by a time period or more required for packing of three packs, delivery of the medicines through the medicine-delivery opening 54*e*. In this embodiment, medicines are charged from the collection hopper 42 into the division 52*a* at a timing preceding, by a time period required for packing of five packs, delivery of the medicines through the opening 54*e*, and other medicines are charged from the manual-distribution hopper 44 into the division 52*a* at a timing preceding, by a time period required for packing of four packs, delivery of the medicines through the opening 54*e*.

As illustrated in FIG. 3, below the above-mentioned medicine preparation means 50, there are provided devices such as the packaging-sheet feeding means 60, the printing means 70, the packing means 80, and the packaging-sheet sending mechanism 90. The packaging-sheet feeding means 60 is a mechanism for pulling out and sending the sheet-like elongated packaging sheet P made of a thermal adhesive sheet wound around a roll shaft 62 to the packing means 80. The packaging sheet P pulled out by the packaging-sheet feeding means 60 is successively fed to the packing means 80 via the printing means 70 as indicated by an arrow of FIG. 3.

The printing means 70 is provided to perform printing on the packaging sheet P sent out by the packaging-sheet feeding means 60. As illustrated in FIG. 3, the printing means 70 is provided at a position on an upstream side in a flow direction of the packaging sheet P with respect to the above-mentioned packing means 80. Under a state in which an operation of feeding the packaging sheet P for packing of the medicines is performed, a length of the packaging sheet P existing between respective positions of the printing means 70 and the packing means 80, that is, a length of a path, which the packaging sheet P passes, between the printing means 70 and the packing means 80 is set to be n times (three times in this embodiment) as large as a length L of a longitudinal part of a packaging bag V formed as described below. Thus, a timing when printing is performed on the packaging sheet P in the printing means 70 corresponds to a timing when the medicines are packed in the packing means 80, that is, a timing preceding the timing when the medicines are delivered through the opening 54*e* of the medicine preparation means 50 toward the packing means 80 by the time period required for packing of the medicines corresponding to n packs (three packs in this embodiment).

Here, as described above, in this embodiment, medicines are charged from the collection hopper 42 and the manual-distribution hopper 44 into the division 52*a* at the timing preceding, by the time period or more required for packing of three packs, the timing when medicines are delivered through the opening 54*e* of the medicine preparation means 50 toward the packing means 80. Thus, after the medicines are charged into the division 52*a*, information pieces of the medicines are printed on the packaging sheet P.

In more detail, as illustrated in FIG. 12, in this embodiment, the division formation body 52 are provided with six divisions 52*a*. Description is made, by way of example, of a division 52*a* denoted by number 1 in FIG. 12 (hereinafter, also referred to as "division X"). Medicines stocked in the one division X of the plurality of divisions 52*a* are delivered at a timing when the division formation body 52 is turned as illustrated in FIG. 12(*d*) to the position at which the medicine-delivery opening 54*e* is provided. Meanwhile, medicines are charged from the feeder-type supply portion 36 into the division X at a stage illustrated in FIG. 12(*a*), that is, at a timing preceding the timing when the medicines are delivered from the division X by a time period required for delivery of medicines corresponding to five packs. Further, medicines are charged from the manual-distribution-type supply portion 38 into the division X at a stage illustrated in FIG. 12(*b*), that is, at a timing preceding the timing when the medicines are delivered from the division X by a time period required for delivery of medicines corresponding to four packs. As described above, the information pieces of the medicines in the division X are printed on the packaging sheet P at a stage preceding, by the time period required for packing of three packs, the timing when the medicines are delivered from the division X. Thus, by the time when the information pieces of the medicines in the division X are printed on the packaging sheet P, charge of the medicines from the feeder-type supply portion 36 and the manual-distribution-type supply portion 38 into the division X can be completed.

Figure 6:
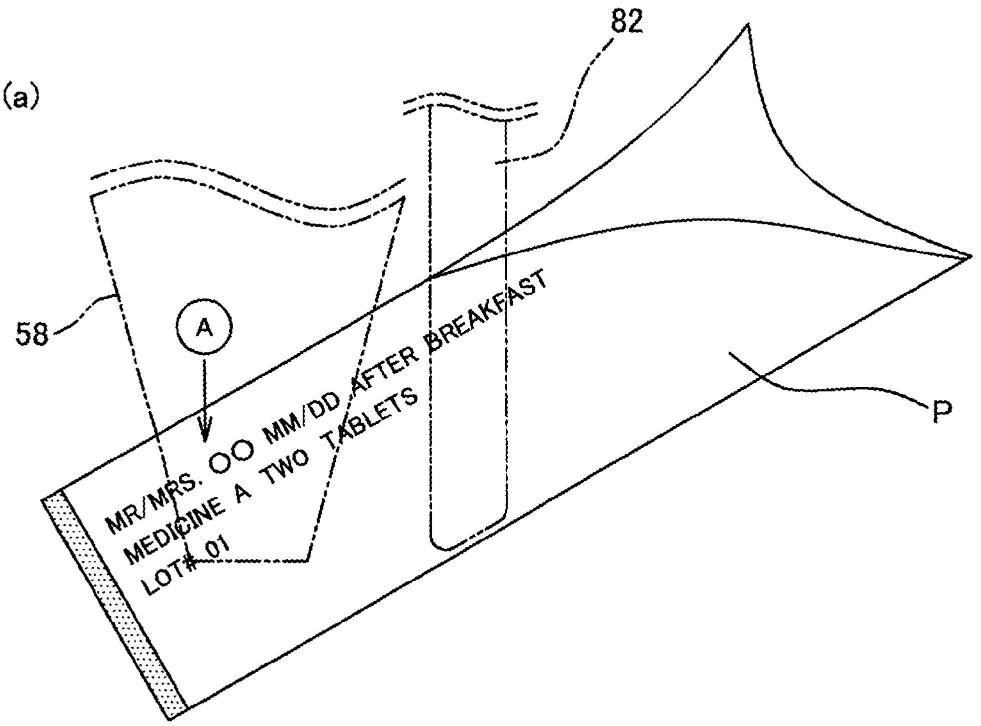
FIG. 6(*a*) is an explanatory diagram illustrating a stage in which a short side of a package is pressure-bonded and sealed.
Figure 6:
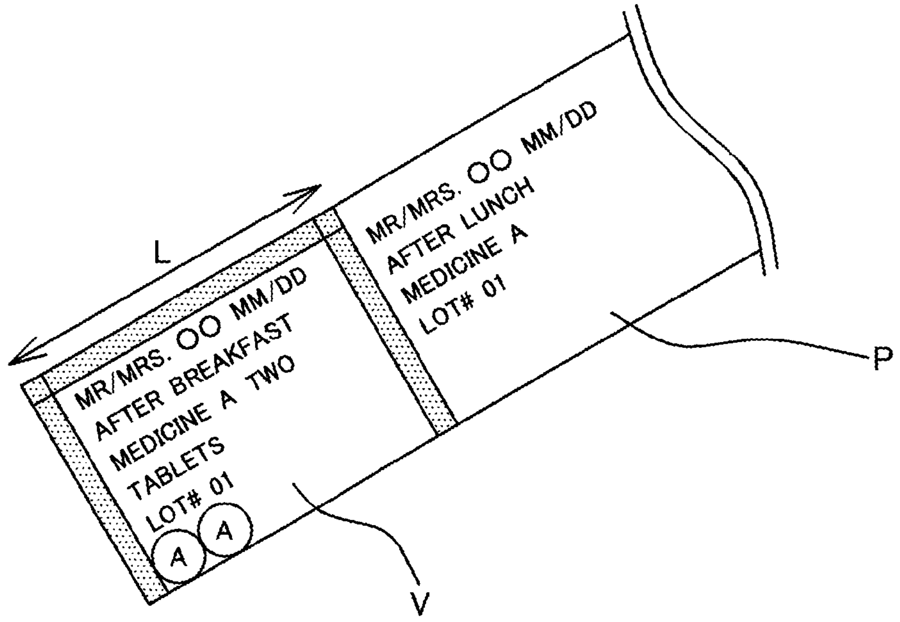

The packing means 80 includes a packaging-sheet folding member 82 and a pressure-bonding device 84. The packing means 80 receives the packaging sheet P on which predetermined information pieces have been printed in the printing means 70 so as to pack the medicines in pack units with use of the packaging sheet P. The packaging-sheet folding member 82 is a bar-like member applied to a substantially central part in a short direction (width direction) of the packaging sheet P fed from a printing-means-70 side, and is capable of folding the packaging sheet P in two at the substantially central part in the short direction (width direction) thereof as illustrated in FIG. 6(*a*) when the packaging sheet P is sent to a downstream side in this state. The pressure-bonding device 84 is capable of forming the packaging bag V by pressure-bonding the packaging sheet P which has been double-plied by being folded by the packaging-sheet folding member 82. As illustrated in FIGS. 6(*b*) and 11 to 15, the packaging bags V are formed continuously in a longitudinal direction of the packaging sheet P (sending direction of the packaging sheet P).

The pressure-bonding device 84 is capable of pressure-bonding the packaging sheet P in the following two separate stages: such a stage as to seal by pressure-bonding, as illustrated in FIG. 6(*a*), a short side of the packaging bag V (transverse side in the width direction of the packaging sheet P); and such a stage as to seal by pressure-bonding, as illustrated in FIG. 6(*b*), rest sides of the packaging bag V, that is, a long side (side extending in the longitudinal direction of the packaging sheet P) and another short side parallel to the short side sealed in FIG. 6(*a*). Further, as illustrated in FIG. 6(*a*), at the stage in which the short side of the packaging bag V is sealed by the pressure-bonding device 84, such a state is reached that the discharge hopper 58 is inserted in the packaging bag V in a semi-bag shape in which the long-side part has not yet been sealed. Thus, the medicines can be packed in the packaging bag V by sealing in the following manner: at the stage in which the short-side parts of the packaging bag V are sealed by the pressure-bonding device 84, the medicines are supplied from the medicine-preparation-means-50 side into the packaging bag V in the semi-bag shape, and then the long side of the packaging bag V is sealed by the pressure-bonding device 84 as illustrated in FIG. 6(*b*). The packaging sheet P with which the medicines are packed in this manner is fed by the packaging-sheet sending mechanism 90 provided on a further downstream side with respect to the packing means 80 in a sending direction of the packaging sheet P so as to be delivered from the main unit 20 of the medicine packing apparatus 10 toward an outside.

As illustrated in FIG. 7, the control means 100 mainly includes a control portion 102, and an input device 104 and a PC terminal 106 are connected to the control portion 102 so as to be capable of data communication in a wired or wireless manner. The control portion 102 controls overall operations of the medicine packing apparatus 10, and may include a digital circuit using a CPU. The control portion 102 includes package control means 108, print control means 110, and feeder-information memory means 112. The package control means 108 has such a function as to issue operation command signals, based on prescription data input from the outside, to the above-mentioned medicine delivery means 30, the standby hopper 40, the medicine preparation means 50, the printing means 70, the packing means 80, the packaging-sheet sending mechanism 90, and the like so as control a series of packaging operations. Further, the print control means 110 is provided for performing printing on the packaging sheet P by sending at a predetermined timing print data PD received from the PC terminal 106 described in detail below to the printing means 70 so as to activate the printing means 70.

The feeder-information memory means 112 is capable of building a database (hereinafter, also referred to as “medicine specification database” DB) in which information pieces for specification of the feeder supply portions 36 constituting the medicine delivery means (hereinafter, also referred to as “feeder-specification information pieces” FD) and information pieces for specification of the feeder-type supply portions 36 and types of the medicines prepared therein are correlated with each other, and is capable of recording the correlated information pieces. The feeder-specification information pieces FD may include address information pieces indicating attachment positions of the feeder supply portions 36 and a unique ID number of each of the feeder supply portions 36. In this embodiment, the above-mentioned address information pieces indicating the attachment positions of the feeder supply portions 36 are employed as the feeder-specification information pieces FD. The medicine specification database DB includes the information pieces obtained by correlation of the address information pieces of the feeder supply portions 36 (feeder-specification information pieces FD) and the information pieces for specification of the types of the accommodated medicines. Thus, with reference to the medicine specification database DB, it can be understood that a medicine A (A=type of medicine) is prepared in a feeder supply portion 36 allocated with an address number N (N=natural number).

The input device 104 may include a touch-panel type input device, a conventional well-known keyboard, a mouse, or buttons. In this embodiment, the touch-panel type input device is employed as the input device 104. The input device 104 is used, at the time of loading of the medicines into the feeder-type supply portions 36, for input of information pieces which fluidly change every time the medicines are loaded into the feeder-type supply portions 36, such as information pieces of production histories of the medicines to be loaded (hereinafter, also referred to as “production-history information pieces” MC) and the loading number of the medicines. The production-history information pieces MC may include one or a plurality of information pieces selected from lot numbers of the medicines, production dates of the medicines, use-by dates of the medicines, and the like. In this embodiment, the lot numbers of the medicines are employed as the production-history information pieces MC. The information pieces such as the production-history information pieces MC and the loading number of the medicines input via the input device 104 are transmitted to the PC terminal 106 by way of the control portion 102 so as to be recorded in a memory device such as a hard disk drive prepared in the PC terminal 106.

The PC terminal 106 includes a conventional well-known personal computer, and can be connected to a host terminal or the like (not shown) when necessary. In addition to such a function as to record the above-mentioned information pieces such as the production-history information pieces MC and the loading number of the medicine, the PC terminal 106 has a function as an input terminal for prescription data. Specifically, the PC terminal 106 enables direct input of the prescription data through operation by an operator. Further, when an external device such as the host terminal (not shown) is connected to the PC terminal 106, the prescription data can be input from an external-device side.

The control means 100 is configured as described above, and capable of packing the medicines under control by the package control means 108. In addition, the control means 100 is capable of confirming the types of the medicines delivered from the medicine feeder 46 under driving through access to the feeder-information memory means 112, and reading out the production-history information pieces MC of the medicines from the memory device of the PC terminal 106 so as to confirm the production-history information pieces MC. That is, in this embodiment, the control means 100 exerts a function as production-history specifying means for specifying the production-history information pieces MC.

Figure 8:
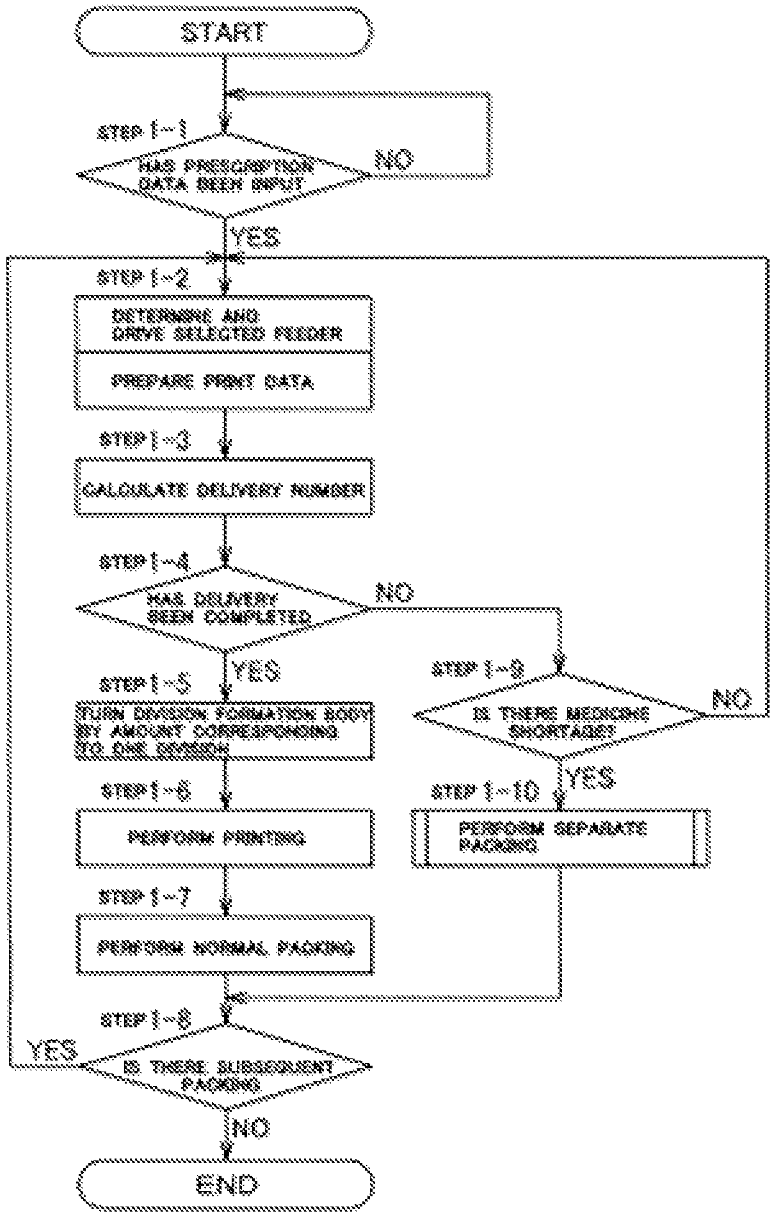
FIG. 8 is a flowchart illustrating an operation of the medicine packing apparatus illustrated in FIG. 1.
Figure 9:
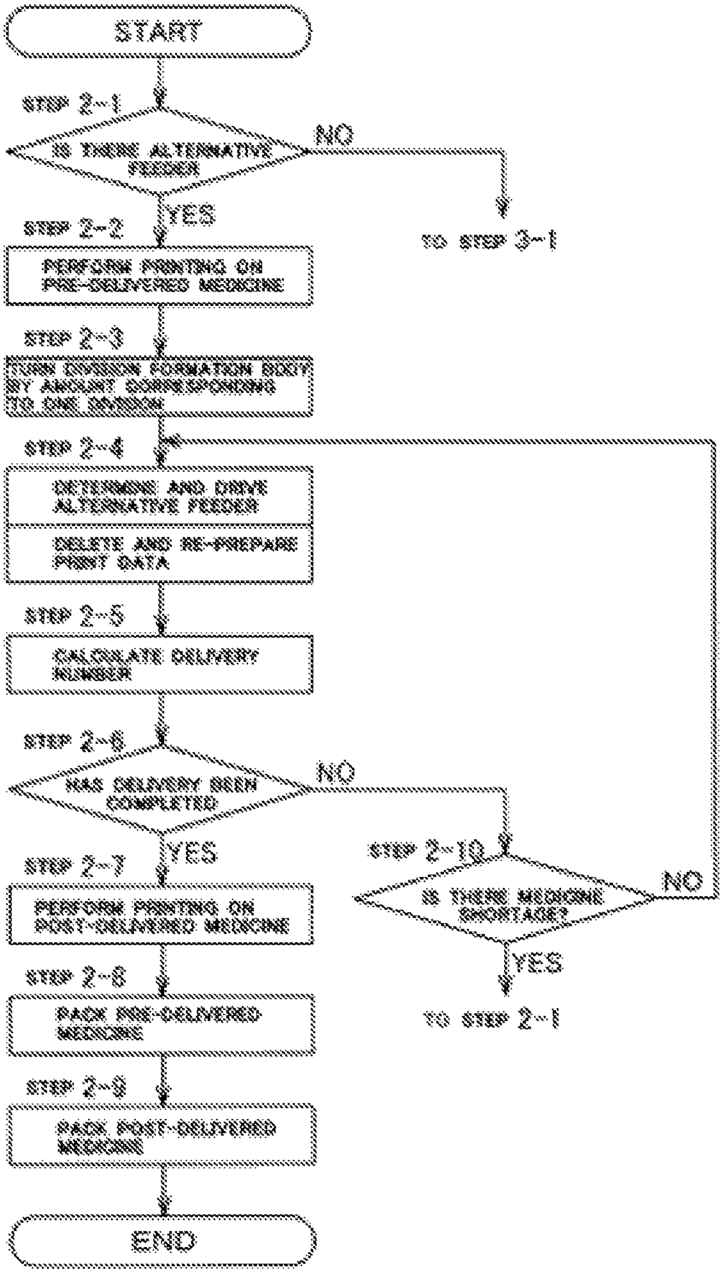
FIG. 9 is a flowchart illustrating another operation of the medicine packing apparatus illustrated in FIG. 1.
Figure 10:
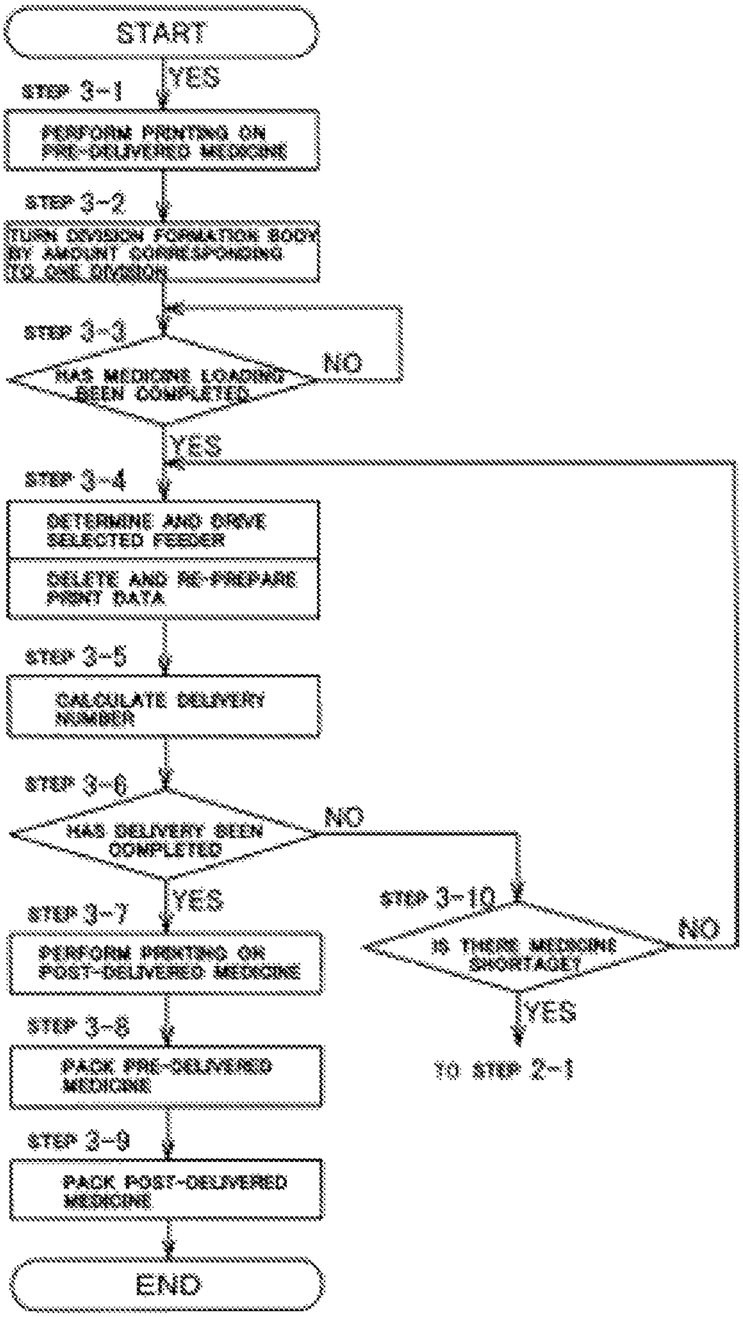
FIG. 10 is a flowchart illustrating still another operation of the medicine packing apparatus illustrated in FIG. 1.

Next, description is made in detail of an operation of the medicine packing apparatus 10 of this embodiment with reference to flowcharts illustrated in FIGS. 8 to 10. First, in Step 1-1, the medicine packing apparatus 10 confirms whether or not prescription data has been input to the PC terminal 106 of the control means 100. When it is confirmed that the prescription data has been input, a control flow proceeds to Step 1-2, and the feeder-information memory means 112 is referred to in the control portion 102. Then, the medicine feeder 46 in which a medicine to be prescribed is accommodated (hereinafter, also referred to as "selected feeder" 46) is determined, and the operation command signal is issued from the control portion 102 to the medicine feeder 46. Further, in Step 1-2, print data PD used for printing on the packaging sheet P in Step 1-5 described below is created.

When the selected feeder 46 starts to be driven based on the operation command signal in Step 1-2, the medicine is delivered. In this case, a medicine detecting signal issued from the medicine discharge sensor 46*a* provided to the selected feeder 46 under driving is received in the control portion 102, and the medicine delivery number is calculated based on the detecting signal (Step 1-3). Further, in Step 1-4, it is confirmed whether or not delivery of the medicine in the selected feeder 46 has been completed. Specifically, it is confirmed whether or not the delivery of the medicine has been completed through comparison of the medicine delivery number calculated in Step 1-3 and the delivery number designated in the prescription data received in Step 1-1. When it is judged that the delivery of the medicine has not yet been completed in Step 1-4, the control flow is returned to Step 1-2, and a medicine delivery operation is continued. Meanwhile, when it is judged that the medicine delivery operation has been completed in Step 1-4, the control flow proceeds to Step 1-6, and the division formation body 52 is turned in a normal direction by an amount corresponding to one division. After that, the control flow proceeds to Step 1-6.

In Step 1-6, the print data PD created in the above-mentioned Step 1-2 and issued from the PC terminal 106 is transmitted to the printing means 70 by way of the control portion 102, and then printing is performed on the packaging sheet P. In this case, in addition to information pieces such as a patient's name and a dose timing, information pieces such as names, numbers, and the production-history information pieces MC of the medicines that have been delivered in the flow corresponding to from Steps 1-2 to 1-4 described above are printed on the packaging sheet P. Specifically, when the name of the medicine is A and the production-history information piece MC is a lot number #01, those information pieces are printed as illustrated in FIG. 6. Alternatively, the number of the medicines and the patient' s name may be appropriately printed.

When the printing is completed in Step 1-6, the control flow proceeds to Step 1-7, and the medicine prepared in the flow corresponding to from Steps 1-2 to 1-4 is packed in the packaging sheet P (refer to FIG. 6(*b*)). After that, the control flow proceeds to Step 1-8, and it is confirmed whether or not there is a medicine to be subsequently packed. When there is a medicine to be subsequently packed, the control flow is returned to Step 1-2, and a medicine packing operation is continued. Meanwhile, when there is no medicine to be subsequently packed, a series of the above-mentioned control flow is completed.

Meanwhile, when it is judged that the medicine necessary for packing has not yet been delivered from the selected feeder 46 in Step 1-4 described above, the control flow proceeds to Step 1-9. In Step 1-9, the reason why it is judged that the delivery has not yet been completed in Step 1-4 is confirmed to be caused by medicine shortage in the selected feeder 4 6 or mere incompletion of the medicine delivery. Specifically, when a state in which the medicines are not detected by the medicine discharge sensors 46*a* continues over a predetermined time period in spite of incompletion of discharge of the medicines by the number corresponding to one dose, it is judged that the medicine shortage has occurred. Here, when it is judged that the medicine delivery has not yet been completed, that is, when it is judged that the medicines are being delivered, the control flow is returned to Step 1-2. Until the medicine delivery of a required amount is completed, the operation of the medicine feeder is continued.

In contrast, when the reason why it is judged that the delivery has not yet been completed in Step 1-4 is the medicine shortage in the selected feeder 46, the control flow proceeds to Step 1-10, and a separate-packing operation is performed. Specifically, when the control flow proceeds to Step 1-10, control according to subroutines illustrated in FIGS. 9 and 10 is started. In the subroutine illustrated in FIG. 9, first, in Step 2-1, it is confirmed whether or not there is the medicine feeder 46 capable of delivering a medicine to be delivered (hereinafter, also referred to as "alternative feeder" 46). Here, the control flow proceeds to Step 2-2 when there is the alternative feeder 46, and proceeds to Step 3-1 described in detail below when there is no alternative feeder 46.

Figure 11:
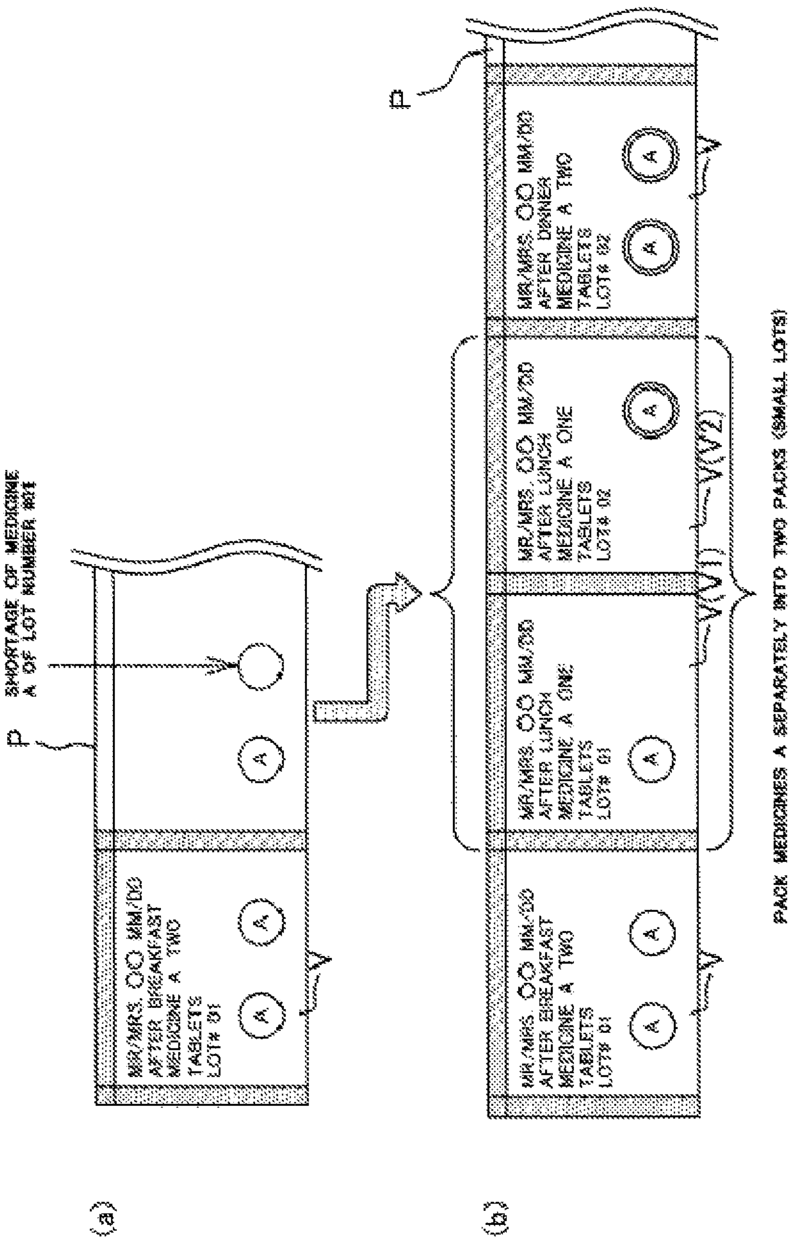
FIGS. 11(*a*) and 11(*b*) are explanatory diagrams illustrating a packing form at the time of packing of medicines having different production-history information pieces.

When the control flow proceeds to Step 2-2, as are printed on a packaging bag V1 of FIG. 11(*b*), in addition to the information pieces such as the patient's name and the dose timing of the medicines, there are printed information pieces such as a name, the number, and the production-history information piece MC of a medicine that has already been delivered from the selected feeder 46 (pre-delivered medicine). Specifically, when the control flow proceeds to a flow corresponding to Step 2-1 and subsequent Steps, as illustrated in FIG. 11(*b*), the pre-delivered medicine and a medicine which is short in supply in pre-delivery (post-delivered medicine) are packed in different packaging bags V1 and V2. Thus, when the control flow proceeds to Step 2-2, the print data PD that has been prepared by the print control means 110 at a timing preceding Step 2-2 is discarded. Then, print data which reflects information pieces such as names, the numbers, and production-history information pieces MC of medicines to be accommodated in the packaging bags V1 and V2 is prepared. In Step 2-2, based on the print data PD re-prepared by the print control means 110, the information pieces of the pre-delivered medicine to be packed into the packaging bag V1 are printed.

Further, in Step 2-3, in response to the control command signal from the control portion 102, the division formation body 52 turns in the normal direction by the amount corresponding to one division 52*a*. With this, the division 52*a* accommodating the medicine delivered from the selected feeder 46 moves in the circumferential direction of the division formation body 52, and such a state is reached that a medicine can be charged into next division 52*a*. That is, by turning of the division formation body 52 in Step 2-3, the medicine delivered from the selected feeder 46 and medicines to be delivered in subsequent Steps in the control flow can be accommodated in separate divisions 52*a*.

Specifically, when the production-history information pieces MC of the medicines to be packed as one dose (one unit) are same as each other, the medicines are collectively charged into the division 52*a* (division 52*a* denoted by number 1 in the figure) of the division formation body 52 as illustrated in FIG. 12(*a*). In contrast, when medicine shortage occurs in a case where a plurality of medicines of the same type are packed as one dose as illustrated in FIG. 12(*a*), after the pre-delivered medicine is charged into the division 52*a* (division 52*a* denoted by number 2 in the figure) as illustrated in FIG. 12(*b*), the division formation body 52 is turned in the normal direction by the amount corresponding to one division 52*a* as indicated by the arrows of the figure (refer to FIG. 12(*c*)). With this, the pre-delivered medicines and medicines which are to be delivered in subsequent Steps and have different production-history information pieces MC are prevented from being mixed with each other in one division 52*a* (refer to FIG. 12(*d*)).

When turning of the division formation body 52 is completed in Step 2-3, the control flow proceeds to Step 2-4. Then, the alternative feeder 46 is determined, and an operation command signal is issued from the control portion 102 to the alternative feeder 46. With this, a medicine which is short in supply in the delivery operation of the medicine from the selected feeder 46 can be delivered from the alternative feeder 46. As illustrated in FIGS. 12(*c*) and (*d*), the medicine delivered from the alternative feeder 46 is charged into different division 52*a* (division 52*a* denoted by number 3 in the figure) from the divisions 52*a* for the pre-delivered medicines. Further, when the alternative feeder 46 is driven in Step 2-4, the control flow proceeds to Step 2-5, and the medicine delivery number is calculated in the control portion 102 based on the detecting signal issued from the medicine discharge sensor 46*a* provided to the alternative feeder 46.

Here, the print data PD which has been created in Step 1-2 described above is prepared on a premise that normal packing is performed (Step 1-7). Thus, in order to perform separate packing, it is necessary to re-prepare the print data PD so that printing corresponding to the separate packing is performed. Thus, in parallel with determination of the alternative feeder 46 in Step 2-4, the print data PD that has been prepared in Step 1-2 is deleted and re-prepared.

When it is judged that the medicine delivery has not yet been completed in Step 2-6 as a result of the calculation in Step 2-5, the control flow proceeds to Step 2-10. Then, the reason why it is judged that the medicine delivery has not yet been completed is confirmed to be caused by medicine shortage in the alternative feeder 46 or the fact that the medicine delivery is being carried out. Specifically, as in the case of Step 1-9 described above, when a state in which the medicines are not detected by the medicine discharge sensors 46*a* continues over a predetermined time period in spite of incompletion of discharge of the medicines corresponding to one dose, it is judged that the medicine shortage has occurred. Here, when it is judged that the medicine delivery is being carried out, the control flow is returned to Step 2-4, and the medicine delivery in the alternative feeder 46 is continued. Meanwhile, when it is judged that the medicine delivery has not yet been completed owing to the medicine shortage in the alternative feeder 46, the control flow is returned to Step 2-1. In this case, when there is still another medicine feeder 46 alternative to the alternative feeder 46, the control flow proceeds to Step 2-2 as in the above-mentioned case. Meanwhile, when it is judged that there are no alternatives to the alternative feeder 46, the control flow proceeds to Step 3-1.

Meanwhile, when it is confirmed in Step 2-6 that the medicine delivery in the alternative feeder 46 has been completed, the control flow proceeds to Step 2-7. In Step 2-7, as are printed on the packaging bag V2 in FIG. 11(*b*), in addition to the information pieces such as the patient's name and the dose timing, there are printed information pieces such as a name and the production-history information piece MC of the medicine delivered from the alternative feeder 46 (post-delivered medicine). Specifically, in the example illustrated in FIG. 11(*b*), a lot number corresponding to the production-history information piece MC of the medicine A delivered from the alternative feeder 46 is #02, and hence a name of the medicine A and the lot number #02 are printed on the packaging bag V2.

After that, when the control flow proceeds to Step 2-8, first, the medicine delivered from the alternative feeder 46 is packed with the packaging sheet P (packaging bag V) that has undergone printing in Step 2-2. Specifically, in the example illustrated in FIG. 11(*b*), the medicine A of the lot number #01, which is delivered from the selected feeder 46, is packed into the packaging bag V1. Further, when packing of the medicines in Step 2-8 is completed, the control flow proceeds to Step 2-9, and the medicine delivered from the alternative feeder 46 is packed with the packaging sheet P (packaging bag V) that has undergone printing in Step 2-7. Specifically, in the example illustrated in FIG. 11(*b*), the medicine A of the lot number #02, which is delivered from the alternative feeder 46, is packed into the packaging bag V2 formed continuously with the packaging bag V1. With this, such a state is reached that the medicine delivered from the selected feeder 46 and the medicine delivered from the alternative feeder 46 are respectively packed in the separate packaging sheets P (packaging bags V).

When it is judged in Step 2-1 described above that there is no alternative feeder 46, the control flow proceeds to Step 3-1. In Step 3-1, first, in addition to the information pieces such as the patient's name and the dose timing of the medicines, there are printed information pieces such as a name and the production-history information piece MC of a medicine that has already been delivered (pre-delivered medicine). After that, the control flow proceeds to Step 3-2, and the division formation body 52 turns in the normal direction by the amount corresponding to one division 52*a* in response to the control command signal from the control portion 102. With this, as in the case of Step 2-3 described above, the division 52*a* accommodating the medicine that has been already delivered moves in the circumferential direction of the division formation body 52 from such a position as to be capable of receiving the medicine from the collection hopper 42. Thus, such a state is reached that medicines to be delivered from the collection hopper 42 in subsequent Steps in the control flow can be charged into another division 52*a*.

When the division formation body 52 turns in Step 3-2 described above, the control flow proceeds to Step 3-3. In Step 3-3, when such a state is reached that a loading operation of a medicine into the selected feeder 46 has been completed through input of the production-history information piece MC of the medicine that has been loaded in the selected feeder 46 and the loading number of the medicines into the PC terminal 106 with use of the input device 104 such as a touch panel, the control flow proceeds to Step 3-4, and the selected feeder 46 is determined and restarts to be driven. Further, in parallel with the determination and drive-restart of the selected feeder 46, the print data PD that has been prepared in Step 1-2 described above is deleted, and new print data PD is prepared.

When driving of the selected feeder 46 is restarted in Step 3-4, the control flow proceeds to Step 3-5. In Step 3-5, the delivery number of the medicines delivered from the selected feeder 46 is calculated. With this, when the medicine which has been short in delivery number at a stage preceding loading of the medicine into the selected feeder 46 in Step 3-3 is confirmed to have been delivered after the selected feeder 46 starts to be activated in Step 3-4, the control flow proceeds from Step 3-6 to Step 3-7.

In contrast, in a case where the medicine delivery has not yet been confirmed in Step 3-6, the control flow proceeds to Step 3-10. In Step 3-10, the reason why the medicine delivery has not yet been completed is confirmed to be caused by the medicine delivery being carried out or the medicine shortage having reoccurred in the selected feeder 46. Specifically, as in the cases of Step 1-9 and Step 2-10 described above, when the state in which the medicines are not detected by the medicine discharge sensors 46*a* continues over a predetermined time period in spite of incompletion of discharge of the medicines corresponding to one dose, it is judged that the medicine shortage has occurred. Here, when it is judged that the medicine delivery has not yet been completed owing to the medicine shortage in the selected feeder 46, the control flow proceeds to Step 2-2 described above. Meanwhile, when it is judged that the medicine delivery is being carried out in the selected feeder 46, the control flow is returned to Step 3-4.

When it is confirmed that medicine delivery has been completed in Step 3-6 as described above, the control flow proceeds to Step 3-7. Then, in addition to the information pieces such as the patient's name and the dose timing of the medicines, there are printed information pieces such as a name and the production-history information piece MC of the medicine (post-delivered medicine) delivered after loading of the medicine into the selected feeder 46 (refer to FIG. 11). After that, when the control flow proceeds to Step 3-8, the medicines (pre-delivered medicines) that have been delivered before loading of the medicine into the selected feeder 46 are packed with the packaging sheet P (packaging bag V) that has undergone printing in Step 3-1. Further, when packing of the medicines in Step 3-8 is completed, the control flow proceeds to Step 3-9, and the medicine (post-delivered medicine) delivered after replenishment of the medicine into the empty selected feeder 46 is packed with the packaging sheet P (packaging bag V) that has undergone printing in Step 3-7. With this, such a state is reached that the medicine delivered from the selected feeder 46 and the medicine delivered from the alternative feeder 46 are respectively packed in the separate packaging sheets P (packaging bags V). That is, the medicines that have been commanded to be packed as one unit in prescription data enter such a state as to be packed with different packaging bags V based on the production-history information pieces MC thereof.

As described above, in the medicine packing apparatus 10 in this embodiment, the control means 100 is capable of specifying the production-history information pieces MC based on the production histories of the medicines delivered from the medicine feeders 46. Thus, when medicines having different production-history information pieces MC while being of the same type are delivered from the medicine feeders 46, medicines corresponding to one dose are separately packed based on the different production-history information pieces MC. Specifically, in the above-mentioned medicine packing apparatus 10, in a case where medicines to be packed as one dose, specifically, medicines, which are normally collectively packed in one pack so as to be collectively taken at one time, include a plurality of medicines of the same type, when the plurality of medicines of the same type are collectively packed, medicines having different production-history information pieces MC are mixed with each other. Thus, the plurality of medicines of the same type are packed based on the different production-history information pieces MC. Further, in the medicine packing apparatus 10, the production-history information pieces MC of the medicines specified by the control means 100 are printed on the packaging sheets P (packaging bags V) by the printing means. Thus, in the medicine packing apparatus 10, even when medicines having different production-history information pieces MC are delivered for packing, with reference to the production-history information pieces MC printed on the packaging bags V, correspondences between the medicines and the production-history information pieces MC can be easily and accurately understood.

Further, in the medicine packing apparatus 10 in this embodiment, after medicines have been charged into the divisions 52*a* of the division formation body 52, information pieces of the medicines that have been actually charged into the divisions 52*a* are printed on the packaging sheet P. Thus, in the medicine packing apparatus 10, the packaging sheet P undergoes printing on a premise that a medicine to be packed has been charged in the division X, and hence whether or not the medicine to be packed has been correctly charged can be easily monitored. Further, in the medicine packing apparatus 10, printing is not performed on the packaging sheet P when a failure of medicine supply occurs with respect to the divisions 52*a* constituting the division formation body 52. Thus, the packaging sheet P and the like are prevented from being wasted when the failure of medicine supply occurs.

In the above-mentioned embodiment, although the production lot numbers of the medicines are used as the production-history information pieces MC, the present invention is not limited thereto. For example, production dates and use-by dates can be employed as the production-history information pieces MC. Further, the production-history information pieces MC may be obtained by composite combination of information pieces such as the production lot numbers, the production dates, and the use-by dates. Further, the production-history information pieces MC are not limited to textual information pieces, and may include barcodes.

Figure 13:
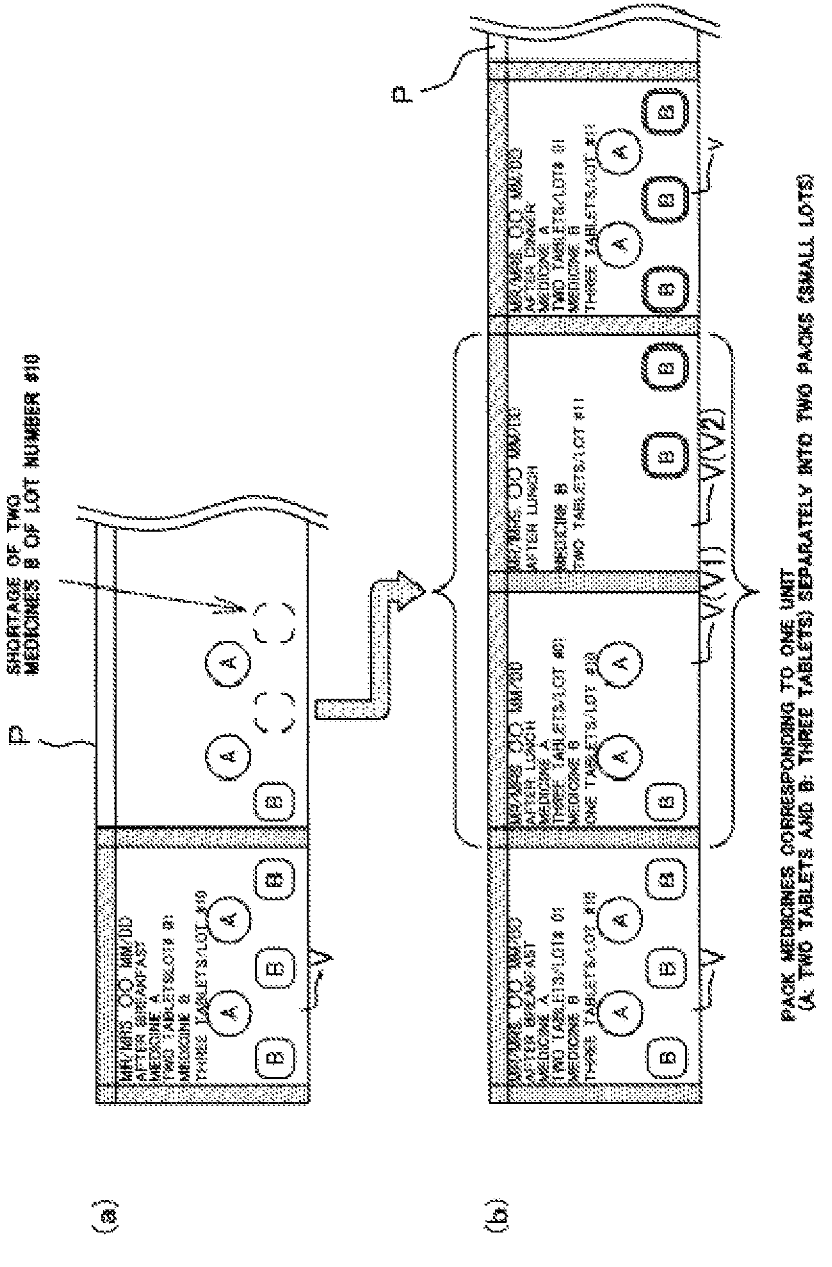
FIGS. 13(*a*) and 13(*b*) are explanatory diagrams illustrating a modification of the packing form illustrated in FIG. 11.
Figure 14:
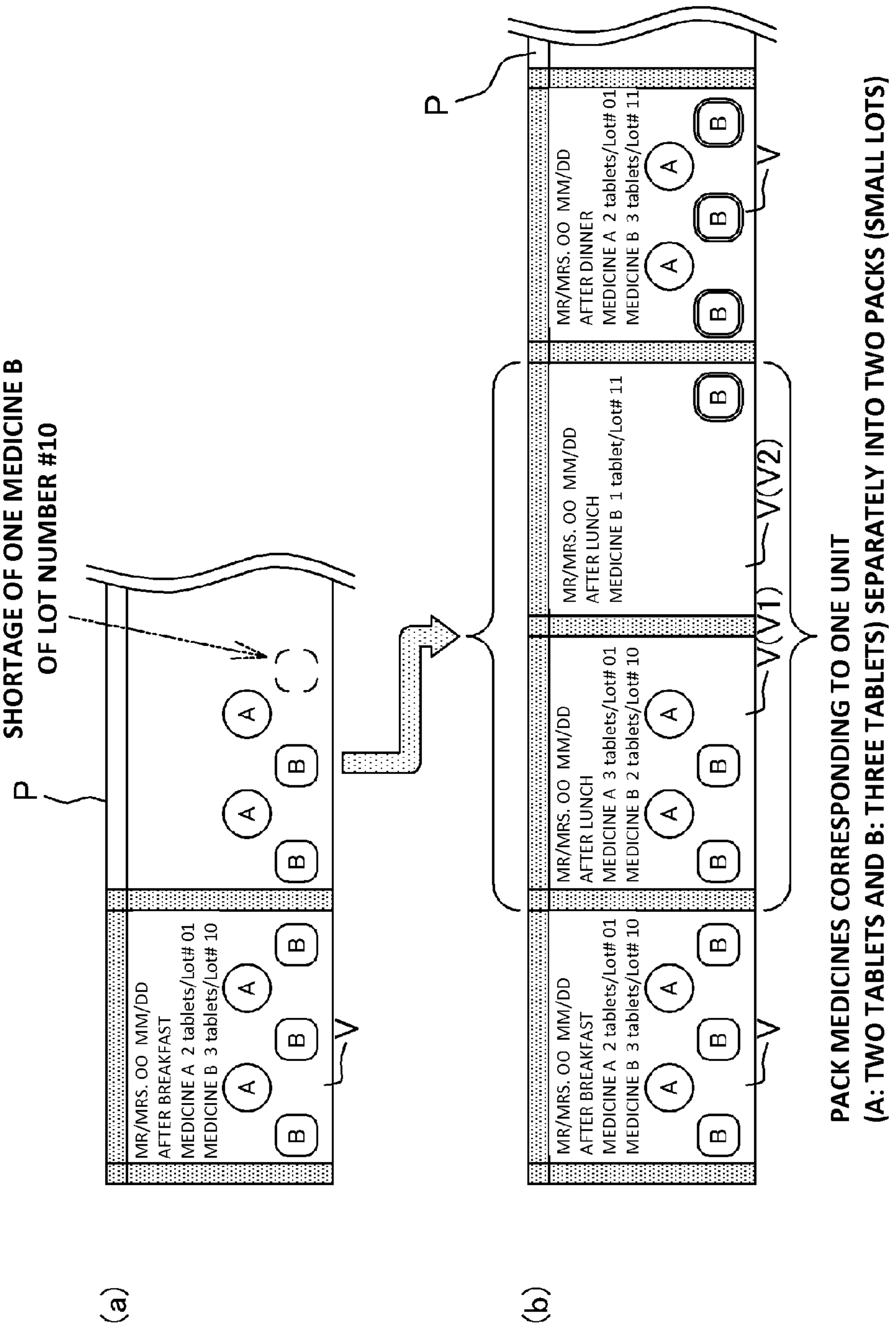
FIGS. 14(*a*) and 14(*b*) are explanatory diagrams illustrating another modification of the packing form illustrated in FIG. 11.

Although only the medicines A are packed in the example illustrated in FIG. 11 described in this embodiment, the present invention is not limited thereto. For example, as in the examples illustrated in FIGS. 13 and 14, medicines of other types (medicines B in the illustrated examples) may be packed together. In this case, as illustrated in FIGS. 13 and 14, the medicines A whose shortage has not occurred and the medicines B (pre-delivered medicines) that have been delivered before occurrence of shortage are collectively packed into the packaging bag V1, and the medicines (post-delivered medicines) that have been delivered after occurrence of shortage are packed into the packaging bag V2. With this, the medicines A and B can be packed so that correspondences between the medicines and the production-history information pieces MC are clarified.

Figure 15:
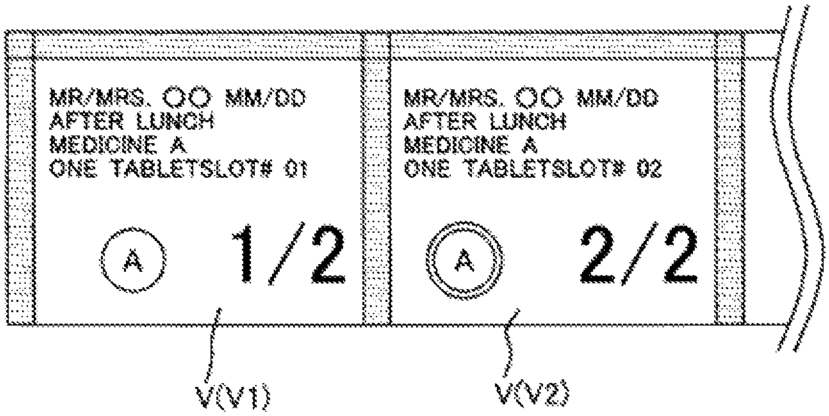
FIG. 15 is an explanatory diagram illustrating still another modification of the packing form illustrated in FIG. 11.

Further, as described above, when the medicines to be packed as one dose are classified based on the production-history information pieces MC and separately packed into two or more packs (small lots), it is desired that, as illustrated in FIG. 15, printing be performed on the packaging sheet V so that the number of the small lots is clarified. Specifically, when medicines to be packed as one dose are separately packed into two small lots (two packs), it is desired that, as illustrated in FIG. 15, printing of, for example, 1/2 and 2/2 be performed on respective packaging bags V so that an awareness is promoted that the medicines corresponding to one dose are packed separately into a plurality of packaging bags V. When such printing is performed in advance, it can be instantly understood that the medicines to be collectively taken at one time are packed separately into a plurality of packs (small lots). As a result, convenience can be further enhanced.

Reference Signs List

10 medicine packing apparatus
30 medicine delivery means
50 medicine preparation means
52 division formation body
52*a* division
70 printing means
80 packing means
100 control means (production-history specifying means)
102 control portion
108 package control means
110 print control means
P packaging sheet
V packaging bag
MC production-history information piece

The invention claimed is:

1. A medicine dispensing apparatus, comprising:

a plurality of stockers, each of which stores a stock of medicines;

a sheet feeder that feeds a packaging sheet;

a medicine supplying device that supplies a dose of medicines to the packaging sheet;

a medicine passageway through which medicines are provided from the stockers to the medicine supplying device;

a medicine packing device that packs the dose of medicines into a package by sealing a portion of the packaging sheet; and a controller that controls the sheet feeder, the medicine supplying device and the medicine packing device;

wherein when the dose of medicines contains a plurality of medicines that are a same kind but provided from different stockers, the medicine dispensing apparatus packs the medicines that are the same kind but provided from the different stockers into different packages.

2. The medicine dispensing apparatus of claim 1, the medicine supplying device comprising a plurality of chambers including a first chamber and a second chamber;

wherein a medicine is provided from one of the stockers to the first chamber of the medicine supplying device through the medicine passageway;

wherein when said one of the stockers becomes empty, the controller seeks an alternative stocker which stocks a same kind of medicines as that of the medicine that has been stored in said one of the stockers; and wherein when the alternative stocker is found, a medicine is provided from the alternative stocker to the second chamber of the medicine supplying device through the medicine passageway.

3. The medicine dispensing apparatus of claim 2;

wherein the medicine supplying device supplies the medicine in the first chamber to the packaging sheet;

wherein the medicine packing device packs the medicine supplied from the first chamber into a package;

wherein the sheet feeder moves the packaging sheet;

wherein the medicine supplying device supplies the medicine in the second chamber to the packaging sheet; and wherein the medicine packing device packs the medicine supplied from the second chamber into a package.

4. The medicine dispensing apparatus of claim 1; wherein the controller compares the medicines provided to the medicine supplying device with a prescription datum and determines if there is a shortage of medicine in the medicine supplying device before the medicine supplying device supplies the dose of medicines to the packaging sheet.

5. The medicine dispensing apparatus of claim 4; further comprising:

an input device through which prescription data is inputted; and a memory that stores the prescription data inputted through the input device;

wherein the controller is accessible to the prescription data stored in the memory.

6. The medicine dispensing apparatus of claim 1, the medicine supplying device comprising:

a plurality of chambers, each of which accommodates medicines, the chambers aligned in circle;

a first opening; and a second opening;

wherein medicines provided through the medicine passageway enters one of the chambers through the first opening;

wherein the chambers rotate around a rotational axis and the medicines are carried toward the second opening along with the rotation of the chambers; and wherein the medicines exit the chamber through the second opening and are supplied to the packaging sheet.

7. A medicine dispensing apparatus, comprising:

a stocker that stores a stock of medicines;

a sheet feeder that feeds a packaging sheet;

a medicine supplying device that supplies a dose of medicines to the packaging sheet;

a medicine passageway through which medicines are provided from the stocker to the medicine supplying device;

a medicine packing device that packs the dose of medicines into a package by sealing a portion of the packaging sheet; and a controller that controls the sheet feeder, the medicine supplying device and the medicine packing device;

wherein when the stocker has become empty and is refilled with a new stock of medicines after the medicines have begun to be provided to the medicine supplying device from the stocker, the medicine dispensing apparatus packs the medicine provided to the medicine supplying device before the stocker has become empty and the medicine provided to the medicine supplying device after the stocker has been refilled into different packages.

8. The medicine dispensing apparatus of claim 7, the medicine supplying device comprising a plurality of chambers including a first chamber and a second chamber;

wherein a medicine is provided from the stocker to the first chamber of the medicine supplying device through the medicine passageway;

wherein when the stocker is empty, the medicine dispensing apparatus notifies a user that the stocker is empty; and wherein after the stocker is refilled with medicines, the medicine is provided from the stocker to the second chamber of the medicine supplying device through the medicine passageway.

9. The medicine dispensing apparatus of claim 8; wherein the medicine supplying device supplies the medicine in the first chamber to the packaging sheet;

wherein the medicine packing device packs the medicine supplied from the first chamber into a package;

wherein the sheet feeder moves the packaging sheet;

wherein the medicine supplying device supplies the medicine in the second chamber to the packaging sheet; and wherein the medicine packing device packs the medicine supplied from the second chamber into a package.

10. The medicine dispensing apparatus of claim 7; wherein the controller compares the medicines provided to the medicine supplying device with a prescription datum and determines if there is a shortage of medicine in the medicine supplying device; and wherein if there is the shortage of medicine in the medicine supplying device, the controller judges that the stocker is empty and makes the medicine dispensing apparatus notify a user that the stocker is empty.

11. The medicine dispensing apparatus of claim 7; further comprising a printer that prints a manufacture information of a medicine on the packaging sheet;

wherein when a manufacture information of the medicine provided to the medicine supplying device after the stocker is refilled is different from a manufacture information of the medicine provided to the medicine supplying device before the stocker has become empty, the printer prints the different manufacture informations on the different packages respectively; and wherein the printer prints an indication that said different packages constitute one dose or should be taken by a patient at a same timing.

12. The medicine dispensing apparatus of claim 11; further comprising an input device through which a manufacture information on the stock of medicines is inputted; and a storage device that stores the manufacture information;

wherein the input device accepts an input of a manufacture information on the stock of medicines when the new stock of medicines are refilled in the stocker; and wherein the controller compares the manufacture information on the stock of medicines that have been refilled in the stocker with a manufacture information on the stock of medicines before the stocker has become empty.

13. A medicine dispensing apparatus, comprising:

a sheet feeder that feeds a packaging sheet;

a medicine supplying device that supplies a dose of medicines to the packaging sheet;

a medicine packing device that packs the dose of medicines into a package by sealing a portion of the packaging sheet; and a controller that controls the sheet feeder, the medicine supplying device and the medicine packing device and that accesses to manufacture informations of the medicines;

wherein when the dose of medicines contains a plurality of medicines that are a same kind but that have different manufacture informations, the medicine dispensing apparatus packs the medicines that are the same kind but that have the different manufacture informations into different packages.

14. The medicine dispensing apparatus of claim 13, further comprising a printer that prints manufacture informations on the packaging sheet;

wherein when the medicine dispensing apparatus packs the medicines that are the same kind but that have the different manufacture informations into the different packages, the printer prints said different manufacture informations on the packaging sheet separately.

15. The medicine dispensing apparatus of claim 14, wherein the printer also prints an indication that said different packages constitute one dose or should be taken by a patient at a same timing.

16. The medicine dispensing apparatus of claim 14, wherein the printer also prints a total number of said different packages that constitute one dose.

17. The medicine dispensing apparatus of claim 14, wherein the printer is placed at a place that is more upstream to the sheet feeder than the medicine packing device; and wherein the printer prints said different manufacture informations on the packaging sheet before the medicine supplying device begins to supply the dose of medicines to the packaging sheet.

18. The medicine dispensing apparatus of claim 17, the medicine supplying device comprising:

a plurality of chambers, each of which accommodates medicines, the chambers being aligned;

a first opening, through which the medicines enters one of the chambers; and a second opening, through which the medicines exit the chamber;

wherein a number of chambers from the first opening to the second opening is larger than an assumed number of packages if the packages are assumed to be aligned from the printer to the medicine packing device.

19. The medicine dispensing apparatus of claim 14, further comprising a memory that stores a print data;

wherein when the controller judges that the dose of medicines contains the plurality of medicines that are the same kind but that have the different manufacture informations, the controller deletes a print datum about the dose of medicines in the memory and generates a plurality of new print data containing different manufacture informations.

20. The medicine dispensing apparatus of claim 13, wherein the manufacture information comprises an information selected from the group consisting of a lot number, a manufacturing date, and an expiration date.

21. A medicine dispensing apparatus, comprising:

a plurality of stockers, each of which stores a stock of medicines;

a sheet feeder that feeds a packaging sheet;

a medicine supplying device that supplies a dose of medicines to the packaging sheet;

a medicine packing device that packs the dose of medicines into a package by sealing a portion of the packaging sheet;

a printer that prints manufacture information on the packaging sheet; and a controller that controls the sheet feeder, the medicine supplying device, the medicine packing device and the printer, the controller has access to manufacture information of the medicines and a prescription datum to determine a number of medicines for one dose based on the prescription datum;

wherein:

a first stocker from the plurality of stockers attempts to supply a determined number of medicines to the medicine supplying device, when a number of medicines supplied to the medicine supplying device is insufficient for the determined number of medicines, a second stocker from the plurality of stockers supplies a compensating number of medicines to the medicine supplying device, the medicines supplied by the second stocker are the same kind as those supplied by the first stocker, and the printer prints a manufacture information of medicine supplied by the first stocker and a manufacture information of medicine supplied by the second stocker on the packaging sheet that forms a package for the dose of medicines.

22. The medicine dispensing apparatus of claim 21, wherein the printer also prints an indication that the package having said different manufacture information constitutes one dose of medicines to be taken by a patient at the same time.

23. The medicine dispensing apparatus of claim 21, further comprising a medicine passageway through which medicines are provided from one stocker to the medicine supplying device, wherein the printer prints said different manufacture information on the packaging sheet after medicines are provided from the stocker to the medicine supplying device and before the medicine supplying device supplies the dose of medicines to the packaging sheet.

24. A medicine dispensing apparatus, comprising:

a plurality of stockers, each of which stores a stock of medicines;

a medicine supplying device that dispenses a dose of medicines;

a medicine passageway through which medicines are provided from the plurality of stockers to the medicine supplying device; and a controller that controls the medicine supplying device and has access to a prescription datum to determine a number of medicines for one dose based on the prescription datum, wherein:

a first stocker from the plurality of stockers attempts to supply a determined number of medicines to the medicine supplying device, when a number of medicines supplied to the medicine supplying device is insufficient for the determined number of medicines, a second stocker from the plurality of stockers supplies a compensating number of medicines to the medicine supplying device, the medicines supplied by the second stocker are the same kind as those supplied by the first stocker, and the medicine supplying device dispenses the medicines provided by the first stocker and the medicines provided by the second stocker separately.

25. The medicine dispensing apparatus of claim 24, further comprising a printer that prints manufacture information on a sheet, wherein when the medicine dispensing apparatus dispenses separately the medicines that are the same kind but have different manufacture information, the printer prints separately said different manufacture information on the sheet.

26. The medicine dispensing apparatus of claim 25, wherein the printer also prints an indication that the separately dispensed products constitute one dose of medicines to be taken by a patient at the same time.

27. The medicine dispensing apparatus of claim 26, wherein the printer also prints a total number of the dispensed products that constitute one dose.

28. A method for dispensing a dose of medicines with a medicine dispensing apparatus, the method comprising the steps of:

accessing a prescription datum;

determining a number of medicines for one dose based on the prescription datum;

attempting to obtain a determined number of medicines from a first stocker;

verifying whether a number of medicines obtained from the first stocker is sufficient for one dose of medicines;

obtaining a compensating number of medicines which are the same kind as those stored in the first stocker from a second stocker if the number of medicines obtained from the first stocker has been insufficient; and dispensing the medicines obtained from the first stocker and the second stocker into separate receptacles.

29. The method of claim 28, further comprising the step of labeling each of said separate receptacles with their respective manufacturing information.

* * * * *